US006609968B1

(12) United States Patent
Okada et al.

(10) Patent No.: US 6,609,968 B1
(45) Date of Patent: Aug. 26, 2003

(54) REARING SIMULATION APPARATUS

(75) Inventors: Hiroshi Okada, Tokyo (JP); Takao Kondo, Tokyo (JP)

(73) Assignee: Bandai, Co., Ltd., Tokyo (JP)

( * ) Notice: Subject to any disclaimer, the term of this patent is extended or adjusted under 35 U.S.C. 154(b) by 0 days.

(21) Appl. No.: 09/603,963

(22) Filed: Jun. 26, 2000

Related U.S. Application Data

(63) Continuation of application No. PCT/JP98/05996, filed on Dec. 28, 1998.

(30) Foreign Application Priority Data

Dec. 26, 1997 (JP) ............................................... 9-367784

(51) Int. Cl.⁷ .......................... A63F 13/00; G06F 17/00
(52) U.S. Cl. .......................................... 463/1; 463/42
(58) Field of Search ................................ 345/418, 473, 345/672, 501, 952; 463/1–2, 30–32, 7, 40–42, 37; 703/11; 273/461

(56) References Cited

U.S. PATENT DOCUMENTS 5,572,646 A    11/1996  Kawai et al.
6,268,872 B1 * 7/2001  Matsuda et al. ............ 345/473

FOREIGN PATENT DOCUMENTS

JP  9-152999   6/1997
JP  3043561 U  9/1997

OTHER PUBLICATIONS

Cover Page of WO99/33534.
International Search Report for PCT/JP98/05996.
Patent Abstracts of Japan for Publ. No. 2000–296272 (Oct. 24, 2000) Rearing Simulator of Virtual Life.

* cited by examiner

*Primary Examiner*—Kim Nguyen
(74) *Attorney, Agent, or Firm*—Smith, Gambrell & Russell

(57) ABSTRACT

Rearing simulation game apparatus for a virtual living thing (VLT), as an interactive electronic game with categories of a VLT at every rearing stage increased to variegate game development. A state parameter processor A increases and decreases a "care" parameter representative of a degree of "care" in response to completeness of an operation responsive to a player request, and calculates a "metamorphosis" parameter based on the "care" parameter. Rearing stage processor D selects one category out of a plurality of categories of the VLT lodged in the succeeding rearing stage in accordance with the metamorphosis requirements depending on the "metamorphosis" parameter calculated and the metamorphosis reference value set peculiarly to the "category" of the VLT in the present rearing stage. Rearing state display is provided in terms of a numerical value or figure based on a parameter or a category of the VLT designated by the request operation for the display.

7 Claims, 17 Drawing Sheets

FIG. 14

REARING STAGE TABLE

| LABEL | ADDRESS | BASIC VALUE OF CATEGORY | METAMORPHOSIS REFERENCE VALUE | AGE FOR CATEGORY CHANGE | CATEGORY A2 IN NEXT STAGE | CATEGORY B2 IN NEXT STAGE | CATEGORY C2 IN NEXT STAGE |
|---|---|---|---|---|---|---|---|
| | | | DATA ON VIRTUAL LIVING THING | | | | |
| CATEGORY 1 | N1 | 5 | 50 | 2 | N2 | N3 | N4 |
| CATEGORY A2 | N2 | 15 | 90 | 4 | N5 | N6 | N7 |
| CATEGORY B2 | N3 | 18 | 95 | 5 | N8 | N9 | N10 |
| CATEGORY C2 | N4 | 20 | 100 | 6 | N11 | N12 | N13 |
| | | | — | — | — | — | — |
| VEILED CATEGORY | N99 | 50 | | | | | |

REARING SIMULATION APPARATUS

This application is a continuation of PCT/JP98/05996 having an International filing date of Dec. 28, 1998 published in Japanese under PCT Artical 21(2) and now pending, and which is incorporated herein by reference in its entirety.

TECHNICAL FIELD

This invention relates to an interactive electronic game apparatus arranged into a portable substance by application of, for example, a microcomputer, and particularly to an improvement in a rearing simulation apparatus wherein a virtual character representative of an animal or a plant (hereinafter referred to as an virtual living thing) is presented on the screen of a display unit, and a player who has perceived a state or a request of the virtual living thing on the screen operates an input device to apply the so-called "care" to the virtual living thing, thereby carrying out simulation of the rearing stage of the virtual living thing which receives the "care".

BACKGROUND

A conventional rearing simulation apparatus of this category is disclosed in U.S. Pat. No. 5,572,646 in which as an operation for the so-called "care", administering elements, for example, such as, "water", "light", and "manure", are administered to an virtual plant on the screen of an output device by the administering operation in an input device, and every time an administering amount of every administering element increases to reach a predetermined amount while keeping good balance, the growing stage of the virtual plant on the screen advances by one stage to display an image of the virtual plant in the next growing stage in place of an image of the virtual plant on the screen in the rearing stage at present. However, in the rearing simulation apparatus disclosed in U.S. Pat. No. 5,572,646, a sole image of the virtual living thing is assigned to each of a plurality of growing stages, and the advancing on the growing stages is carried out in a manner such that in place of an image of the virtual living thing peculiar to the growing state at present, an image of the virtual living thing peculiar to a next growing stage succeeding the growing stage at present is selected, as a consequence of which with respect to a plurality of images of the virtual living thing connected to a single thread through a plurality of growing stages, an image of a next growing stage solely decided succeeding the image of the growing state at present is uniformly selected. Accordingly, the number of categories of the images of the virtual living thing through all the growing stages is,linked with the number of the growing stages, and categories of a variety of images at every growing stage are not prepared. Therefore, the development of the rearing simulation as a game is monotonous, likely resulting in a problem of weakness in a feeling of satisfaction in tastefulness in terms of a game.

DISCLOSURE OF THE INVENTION

In view of the problem of a feeling of satisfaction in tastefulness in terms of a game based on the aforementioned background, a subject of this invention lies in that one category is selected out of categories of a plurality of images of a virtual living thing lodged in a next rearing stage (hereinafter merely referred to as a category) based on the metamorphosis requirements depending on the state parameters of the virtual living thing to promote the virtual living thing to the next rearing stage to thereby solve the aforementioned problem, and the number of categories of the virtual living thing throughout all the rearing stages is increased in a large scale to variegate the game development of the rearing simulation, thus enhancing the satisfaction of a player in the tastefulness in terms of a game.

A further subject of this invention lies in that a "care" parameter representative of a degree of the "care" by a player with respect to the virtual living thing and a "character" parameter which increases and decreases depending on the "care" parameter are introduced, the virtual living thing announces for itself the operation requests of the predetermined items such as "hunger", "displeasure", and "sickness" depending on the "character" parameter; and similarly, an "metamorphosis" parameter which increases and decreases depending on the "care" parameter is introduced to change, the requirements for the metamorphosis depending on the "metamorphosis" parameter to facilitate the selection of a variegated and unexpected category out of a plurality of categories in the next rearing stage, and the requirements for a veiled rearing stage are introduced as singular requirements to enable selection of a veiled category which is few and far between, as a category of the next rearing stage whereby a generic character of the actual living thing is expressed emphatically to characterize the virtual living thing as being in nature "friendly" in one aspect, and "wily" in the other aspect to a degree that could not be characterized by the background art to make the tastefulness in terms of a game.

Another subject of this invention lies in that all or a part of categories in all the rearing stages from an egg are replaced with another set of categories all at once in advance depending on the data of an egg of a virtual living thing received via a communication network to enlarge the range of the selectable categories at every rearing stage, and the data representative of a category at every rearing stage of the virtual living thing can be transmitted and received as the data on the virtual living thing via a communication network, whereby the range of games is enlarged over the communication network to secure the unexpectedness of development of a game to a degree that could not be secured by the background art, thus making the tastefulness in terms of a game further rich.

According to a first aspect of this invention in order to solve the subjects as described above, the invention of claim 1 is claimed. The invention of claim 1 is constituted such that as shown in FIG. 1 corresponding to the claims, a state parameter processing means A increases and decreases the state parameter based on elements fluctuating chronometrically by means of a timer in connection with the state parameter representative of a virtual living thing and elements fluctuating in operation properties in connection with the state parameter responsive to operation responsive to the request by a player and when a predetermined state parameter meets the predetermined requirements for an operation request, an operation request processing means B displays a predetermined item of the operation request before a player, and when the age for promoting a category set peculiarly relative to the category of the virtual living thing at every rearing stage and representative of a retaining period for one category has elapsed, a rearing stage processing means D selects predetermined one category out of a plurality of categories lodged in a next rearing stage based on the metamorphosis requirements depending on the state parameters characterizing the category in the next rearing stage to promote the virtual living thing to the next rearing stage, and a rearing state display means E displays a value, at that time, of the state parameters designated by a request operation for displaying the rearing state, or an image of the category in the rearing stage at that time, in response to the request operation for displaying the rearing state by a player.

The invention of claim 1 is further constituted such that as shown in FIG. 3 which explains a flow chart, the state parameter processing means A and the operation request processing means B are realized by the execution, within a microcomputer, of a flow of the state parameter processes (a to g in FIG. 3) for imparting to each state parameter a chronometrically fluctuating trend set peculiarly to each state parameter as well as a fluctuating trend in terms of operation properties responsive to an operation responsive to the request via an input device by a player and by the execution, within a microcomputer, of a flow of operation request processing (h to j in FIG. 3) for deciding that the predetermined state parameters meet the predetermined requirements for an operation request to carry out a certain operation display.

The above-described state parameter processing comprises a "satiety" parameter process (a in FIG. 3) for receiving an input of an operation for "meal" responsive to the request to impart an incremental trend in operation properties to a "satiety" parameter against a chronometrically decremental trend thereof, a "pleasure" parameter process (b in FIG. 3) for receiving an input of the operations for "meal", "play" and "study" responsive to the request to impart an incremental trend in operation properties to a "pleasure" parameter against a chronometrically decremental trend thereof, a "wisdom" parameter process (c in FIG. 3) for receiving an input of an operation for "study" responsive to the request to impart an incremental trend in operation properties to a "wisdom" parameter against a chronometrically decremental trend thereof, an "age" parameter process (d in FIG. 3) for imparting a chronometrically incremental trend to an "age" parameter to clock a retaining period for a category at every rearing stage, a "weight" parameter process (e in FIG. 3) for receiving an input of the operations for "meal" and "play" to impart an incremental trend in operation properties to a "weight" parameter against a chronometrically incremental trend thereof, a "metamorphosis" parameter process (f in FIG. 3) in which a "care" parameter described later is internally input to calculate an "metamorphosis" parameter, and a "physical condition" parameter process (g in FIG. 3), in which both "satiety" and "weight" parameters previously described are internally input, for receiving an input of an operation for "medication" responsive to the request to impart an incremental trend in operation properties to the "physical condition" parameter while an internal incremental trend is imparted thereto.

The above-described operation request processing comprises an operation request process in "hunger" (h in FIG. 3) for deciding that a "satiety" parameter meets the requirements for an operation request in reference to an operation request in "hunger" to carry out an operation display in terms of "hunger", an operation request process "displeasure" (i in FIG. 3) for deciding that a "displeasure" parameter meets the requirements for an operation request in reference to an operation request in "displeasure" to carry out an operation request display in terms of "displeasure", an operation request process "sickness" (j in FIG. 3) for deciding that a "physical condition" parameter meets the requirements for an operation request in reference to an operation request in "sickness" to carry out an operation request display in terms of "sickness".

The invention of claim 1 is furthermore constituted such that as shown in FIG. 3 which explains a flowchart, rearing stage processing means D is realized by the execution, within a microcomputer, of a flow of a rearing stage process (m in FIG. 3) for deciding any one of some metamorphosis requirements is fulfilled, which requirements vary depending on a "metamorphosis" parameter produced by a "metamorphosis" parameter process and a "metamorphosis reference value" set peculiarly to a category of the present rearing stage at the time when an incremental "age" parameter produced by an "age" parameter process (d in FIG. 3) among the state parameter processes (a to g in FIG. 3) reaches an "age for promoting a category" to select the sole category of a next rearing stage corresponding to the metamorphosis requirement fulfilled above out of a plurality of categories lodged in the next rearing stage which categories are arranged in such a manner that each category corresponds to each metamorphosis requirement and prepared by the total number of the metamorphosis requirements.

By the rearing stage processing as described above, a so-called fatal tie that the sole category of the present rearing stage is grown to the sole category of the next rearing stage is creatively broken, and the development of the category in the next rearing stage is variegated depending on the "metamorphosis" parameter also so that the "metamorphosis" parameter is placed under the control of a player by various operations to facilitate the reflection of efforts and intentions of a player on the development of the rearing stage of the virtual living thing. In this sense, the "rearing stage" termed herein is different from the "growing stage" termed in prior art.

Next, according to a second aspect of this invention in order to solve the subjects as described above, the inventions of claims 2, 3 and 4 are claimed. The invention of claim 2 is constituted such that as shown in FIG. 1 corresponding to the claims, the state parameter processing means A increases and decreases a "care" parameter representative of a degree of "care" administered to the virtual living thing according to the completeness of the operations responsive to the requests by a player, also carries out "care" and "character" parameter process for increasing and decreasing a "character" parameter controlling requirements for an operation request of the virtual living thing based on the "care" parameter and a "basic value of category" set peculiarly to a category of the virtual living thing at every rearing stage, and the operation request processing means B carries out an operation request for a predetermined item when the predetermined requirements for the operation request are fulfilled on the state parameters controlled depending on the "character" parameter.

Further, the invention of claim 2 is constituted such that as shown in FIG. 3 explaining a flowchart, the operation request processing means B is realized by the execution, within a microcomputer, a flow of a "care" parameter process (k in FIG. 3) for calculating a "care" parameter based on a "satiety" parameter value in a "satiety" parameter process (a in FIG. 3) and a "pleasure" parameter value in a "pleasure" parameter process (b in FIG. 3), a flow of a "character" parameter process (l in FIG. 3) in which a "care" parameter value calculated thereat, that is, a parameter value representative of a degree of "care" administered by a player to the virtual living thing by means of an operation for "meal" responsive to the request in a "satiety" parameter process (a in FIG. 3) and the operations for "meal", "play" and "study" responsive to the request in a "pleasure" parameter process (b in FIG. 3) is internally reflected, and some corrections irrespective good or bad are made to a "basic value of category" representative of a character peculiar to the category of the predetermined rearing stage according to the degree of "care" to calculate a "character" parameter representative of a resultant character corrected, and a flow of an operation request process in "displeasure" (i in FIG. 3) for deciding that the requirements for an operation request of "displeasure" controlled by the "character" parameter also are fulfilled to carry out an operation request display in terms of "displeasure".

It is possible for a player to experience the dramatic rearing circumstances of the virtual living thing which show similarity to what people are experienced in and accustomed to through the infant education and pet taming in the way that by having recourse to the operation request process in "displeasure" depending on the "character" parameter as described above, the better the degree of the "care" by a player, the character of the category of the virtual living thing is turned into good, and the frequency of occurrence of the operation request display in terms of "displeasure" is decreased by the equivalent amount, and conversely thereto, the worse the degree of the "care" by a player, the character of the category of the virtual living thing is turned into worse, and the frequency of occurrence of the operation request display in terms of "displeasure" is increased by the equivalent amount.

In this case, also with regard to a display of the state parameters secured by a rearing state display process (n in FIG. 3) and a display of the categories of the present rearing stage, other than the operation request displays in terms of "displeasure", "hunger", and "medication", the displays seen here likewise greatly contribute to realization of the dramatic rearing circumstances of the virtual living thing which show similarity to what people are accustomed from a viewpoint that a player could be.motivated by the intended selection of the items for the operations responsive to the request and the active operations for the same items which items are advantageous in terms of a game of the rearing simulation among various items.

The invention of claim 3 is constituted such that as shown in FIG. 1, the state parameter processing means A increases and decreases a "care" parameter representative of a degree of "care" administered to the virtual living thing according to the completeness of the operations responsive to the requests by a player, and also carries out "care" and "metamorphosis" parameter process for calculating an "metamorphosis" parameter controlling the metamorphosis requirements based on the "care" parameter; and the rearing stage processing means D selects one category out of a plurality of categories lodged in a next rearing stage based on the metamorphosis requirements which are influenced by a metamorphosis parameter at present and a metamorphosis reference value set peculiarly to the category of a present rearing stage to promote the virtual living thing to a next rearing stage.

Further, according to the constitution of the invention as set forth in claim 3, the state parameter processing means A is realized by the execution, within a microcomputer, of a flow of a "metamorphosis" parameter process combined with a "care" parameter process in which as shown in FIG. 3 explaining a flowchart, a "care" parameter calculated by a "care" parameter process (k in FIG. 3) is internally reflected to calculate in a "metamorphosis" parameter process (f in FIG. 3) a metamorphosis parameter which increases and decreases depending on a degree of the "care" by a player. As a result, the rearing stage processing means D is realized by the execution, within a microcomputer, of a flow of the rearing stage process which decides that any one out of a plurality of the metamorphosis requirements stipulated in a contrasting relation between the "metamorphosis" parameter calculated under the influence of the "care" by a player and the "metamorphosis reference value" peculiar to a category of a present rearing stage, to select one category out of a plurality of categories in the next rearing stage.

By means of the connection between the "care" and "metamorphosis" parameter process and the rearing stage process as described above, the "basic value of category" to be input in a "character" parameter process (1 in FIG. 3) can be arranged in correspondence to a plurality of categories in the next rearing stage so that the better the degree of "care" by a player, the more favorable category in character is selected as the category in the next rearing stage of the virtual living thing. By doing so, it is possible for a player to experience the rearing circumstances of the virtual living thing which arouse his sympathy in the light of people's view of life that they are recompensed for the care sufferings.

The invention of claim 4 is constituted such that as shown in FIG. 1 corresponding to the claims, the rearing stage processing means D uniquely selects a veiled category out of a plurality of categories loaded in the next rearing stage to promote the virtual living thing to the next rearing stage, when the state parameters meet the requirements for a veiled rearing stage which are met rarely in comparison with the metamorphosis requirements.

Further, according to the above-described constitution of the invention of claim 4, the rearing stage processing means D is realized by the execution, within a microcomputer, of a flow of the rearing stage process, which is provided with the condition of the unique veiled rearing stage defined by unusual combined numerical values of state parameters other than the metamorphosis requirements depending on the "care" parameter, so as to select the veiled category in the veiled rearing stage as the category in the next rearing stage as far as the condition of the veiled rearing stage is fulfilled.

By means of the rearing stage process including the veiled rearing stage process as described above, the requirements for the veiled rearing stage can be fixed so that an encounter with the unexpected and unusual veiled category that is rarely influenced by intentions or efforts of a player is expected. By doing so, it is possible for a player to experience the rearing circumstances which can be convinced of his acceptance in the light of people's experience of life telling much about an encounter with the good fortune such as a "windfall".

According to a third aspect of this invention in order to solve the subjects as described above, the inventions of claims 5 and 6 are claimed. The invention of claim 5 is constituted such that as shown in FIG. 1 corresponding to the claims, an egg data receiving means F receives the data on the egg of the virtual living thing via a communication network, and the rearing stage processing means D replaces whole or a part of a plurality of categories lodged in each of one or a plurality of rearing stages with other categories identified by the received data on the egg of the virtual living thing, and selects one category out of a plurality of categories lodged in the next rearing stage, including the above-described other categories replaced to promote the virtual living thing to the next rearing stage.

Further, according to the invention of claim 5, the rearing processing means D is realized by the execution, within a microcomputer, of a flow of the rearing stage process such that a rearing stage table is switched to a separate rearing stage table viz, each of respective rearing tables which corresponds to the data on an egg of the virtual living thing.

The rearing stage table readably stores a set of data arranged separately with respect to respective ones of plural categories at every succeeding rearing stage, based on the data on the egg of the virtual living thing received through the egg data receiving means F from a rearing simulation control station on the communication network at the initial portion of the rearing stage and arranged to define the basic generic character of the subject category, for example, such as "basic value of category" influencing the basic value of the "character" parameter, "metamorphosis reference value" influencing the metamorphosis requirements, "the age for promoting a category" identifying a retaining period, "a plurality of selectable categories in the next rearing stage" and so on.

By means of the rearing stage process including the switching process of the rearing stage table as described above, player's curiosity to the virtual living thing itself is greatly burned by the unexpected development of the rearing simulation caused by a variety of encounters with a separate virtual living thing expressed in terms of a piece of separate "heredity information" among a number of virtual living things each of which is expressed in terms of the whole of the selectable categories at every rearing stage possessing a common generic character influenced by the information from an unknown egg to be called, say, "heredity information", based on the data on the egg of the virtual living thing prepared in a state not open to the public in the rearing simulation control station. In this case, in connection with the rearing simulation control station 2C on the communication network, this is used in common for the same type of plural rearing simulation apparatuses 2B arranged on the communication network whereby the range of game processes is extended to the communication network also.

The invention of claim 6 is constituted such that as shown in FIG. 1 corresponding to the claims, a living thing data transmitting and receiving means G transmits and receives the data on the virtual living thing including the data representative of the categories via a communication network. Further, according to the above-described constitution of the invention of claim 6, the living thing data transmitting and receiving means G is realized by the execution, within a microcomputer, of a flow of rearing stage process, wherein in the rearing stage process, the data handled to specify a basic generic character of the category at every rearing stage of the virtual living thing, for example, an address assigned to the subject category on the rearing stage table and a table identity data for identifying the subject rearing stage table itself are input and output to be capable of being transmitted and received via the communication network.

By transmitting and receiving the data on the virtual living thing between the rearing simulation apparatus and the rearing simulation control station via the communication network described above, the data on the virtual living thing with respect to a specific category thereof, after having been processed to be transmitted in the rearing simulation apparatus is transmitted to the rearing simulation control station to be converted at that end to the data on the same virtual living thing, however, with respect to another specific category thereof. The converted data is received and processed at the rearing simulation apparatus end to gain access to another rearing stage per se and another specific category on the rearing stage table identified by the data received and processed in the rearing stage process thereat to facilitate the succession of the instant rearing stage process based on the converted data. By doing so, further the unexpectedness is brought forth to a player by the bilateral expansion of the range of the rearing simulation game over the communication network.

BRIEF DESCRIPTION OF THE DRAWINGS

FIG. 14 is an explanatory view showing a constitution of a rearing stage table referred to during the rearing stage process;

BEST MODE FOR CARRYING OUT INVENTION

Figure 1:
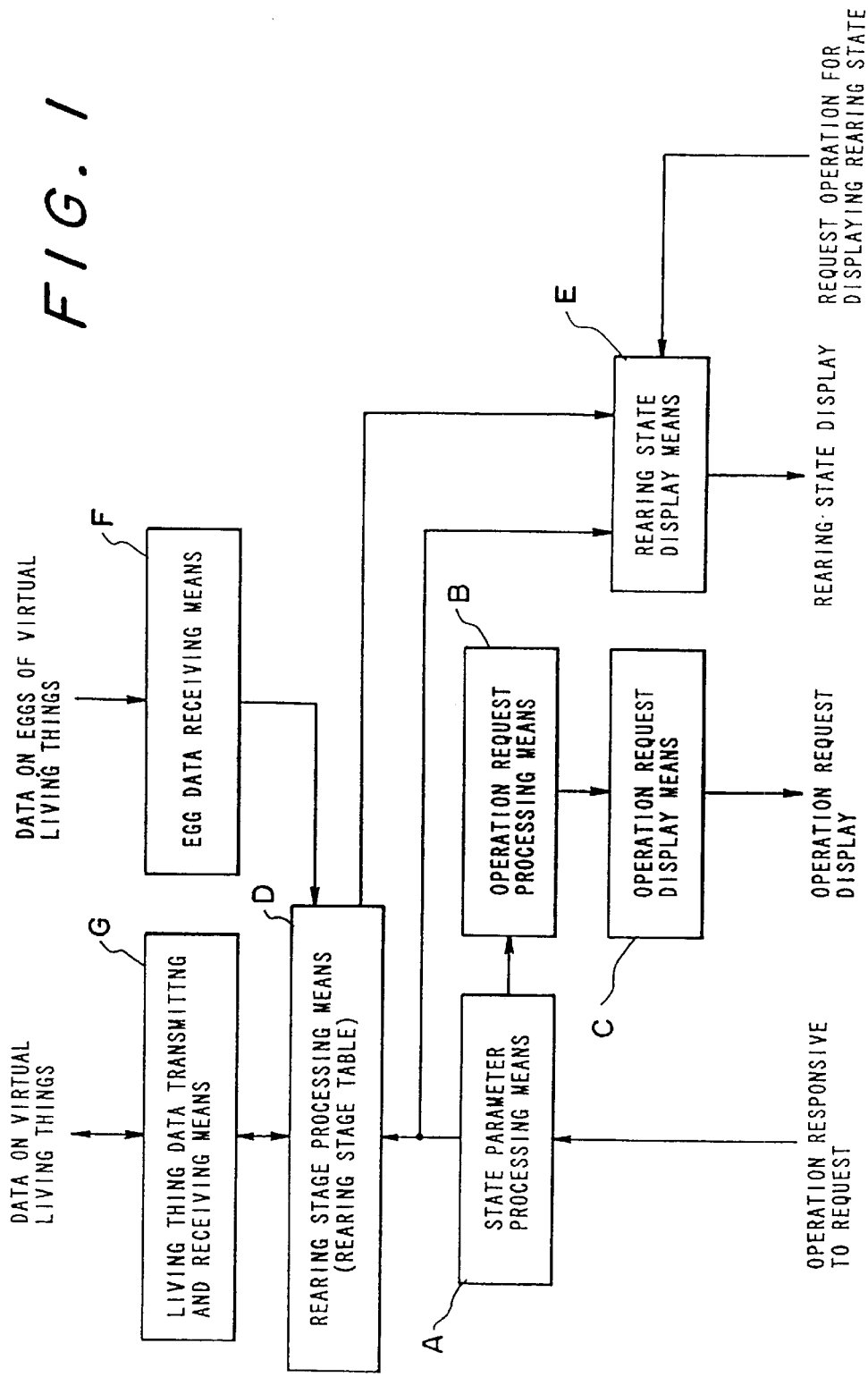
FIG. 1 is a function block diagram based on the function realizing means realized by a microcomputer within a rearing simulation apparatus (a view corresponding to the claim)

The best mode for carrying out the invention will be described hereinafter. In the block constitution on the hardware apparatus 2A and 2B and a single rearing simulation control station 2C are connected to a communication network such as an internet or intranet, and physically, each station forms a party line connection in the form of a so-called "tie in a row" with respect to a common communication line, but in terms of information, an exchange network 1:N is constituted between the single rearing simulation control station 2C and the a plurality of simulation apparatus 2A and 2B. One rearing simulation apparatus 2B out of N pieces of apparatus having the same constitution includes a microcomputer 2a, a memory (RAM) for mainly storing a program itself and a table or the like to secure temporary storage in the execution of a program, an input device 2c provided with a conventional keyboard or the like for carrying out input operation as various operations responsive to the request with respect to the microcomputer 2a, a display device 2d provided with a CRT and liquid crystal display screen or the like to visibly display the operation requests in various items output via the microcomputer 2a, the state parameter or the like, and a voice output device 2e for audibly announcing the operation requests in various items, those of which are mutually connected through a conventional common bus 2f. Further, the computer 2a is connected to the network 1 via a network interface 2g on the bus 2f.

Figure 2:
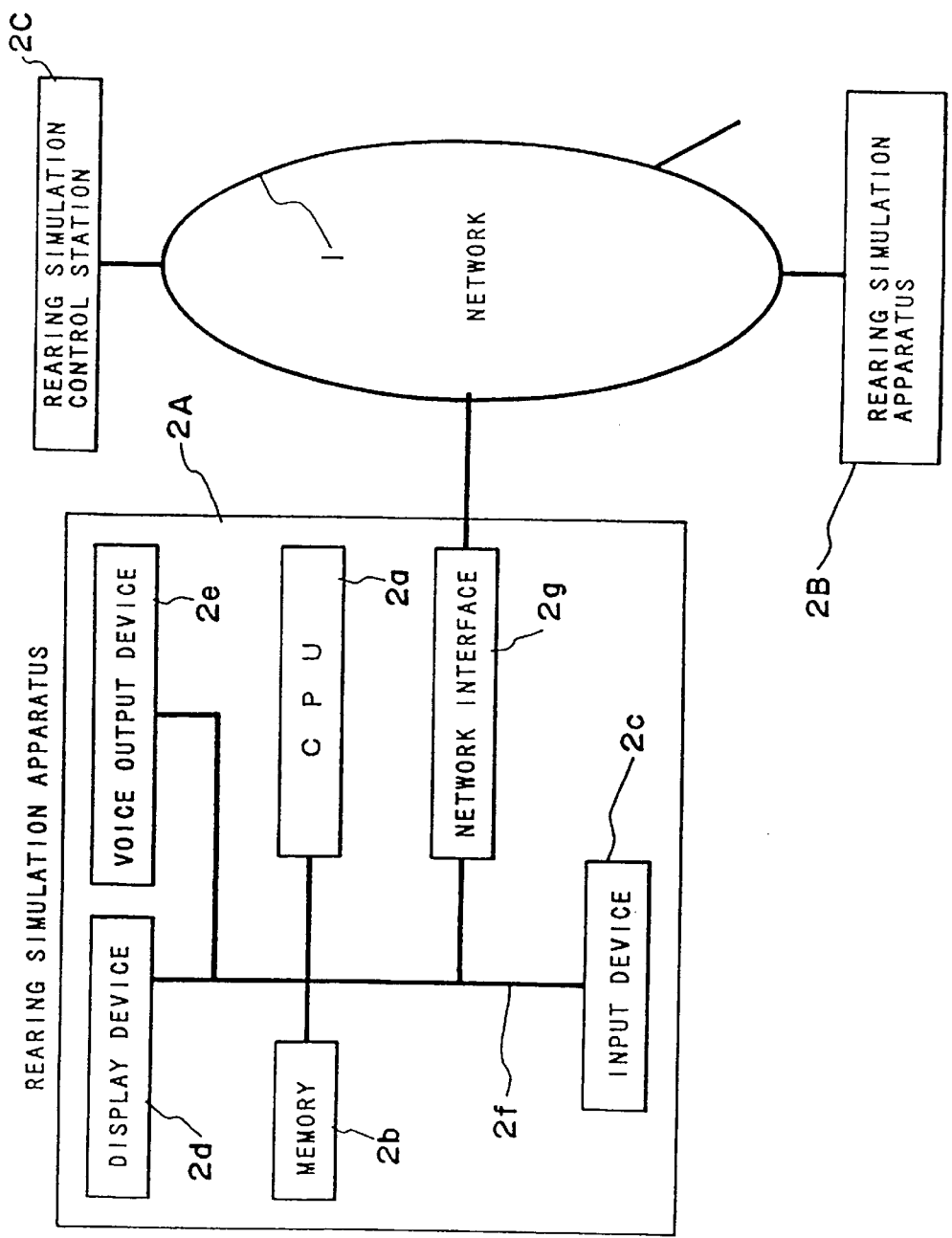
FIG. 2 is a block diagram showing the constitution on the hardware.
Figure 3:
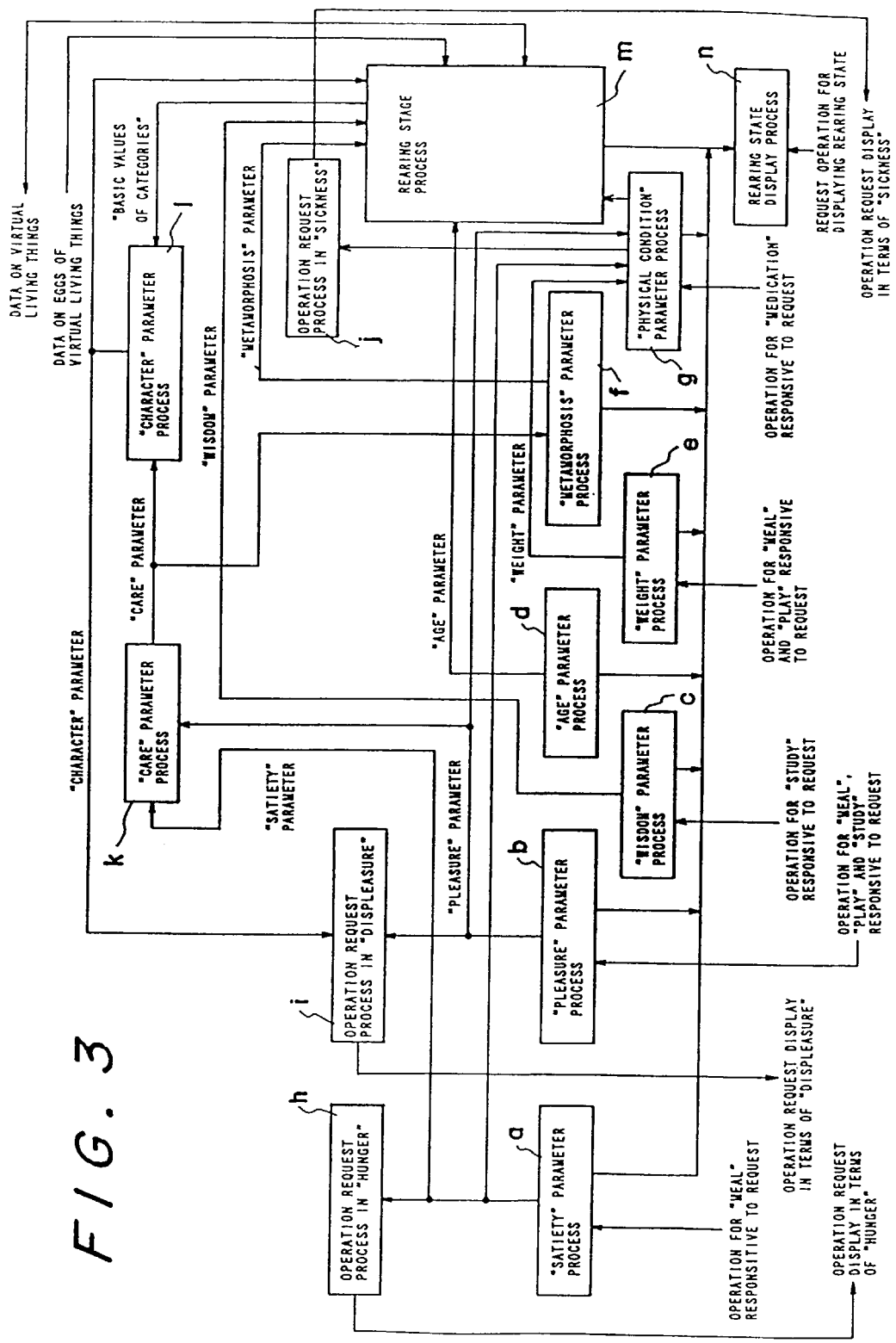
FIG. 3 is a block diagram showing the constitution on the software.

Based on the constitution shown in FIG. 3, a program process executed within the microcomputer 2a constituted on the hardware of FIG. 2 will be described hereinafter with reference to the flowcharts (FIGS. 4 to 14, and FIGS. 16 to 17). In the "satiety" parameter process (a in FIG. 3), when the microcomputer 2a starts the process (a in FIG. 4), a lapse of 2 minutes is decided by means of a timer (b in FIG. 4); where due to the lapse of 2 minutes, the result of the decision (b in FIG. 4) is Yes, "1" is subtracted from the "satiety" parameter (c in FIG. 4), whereas where the result of the decision (b in FIG. 4) is No, the subtraction process (c in FIG. 4) is not executed, but the decision is made on if the operation for "meal" responsive to the request is carried out with respect to the input device 2c (d in FIG. 4). Where the operation for "meal" responsive to the request is carried out, and the result of the decision (d in FIG. 4) is Yes, "10" is added to the "satiety" parameter (e in FIG. 4), whereas the result of the decision (d in FIG. 4) is No, the addition process (e in FIG. 4) is not executed, but the "satiety" parameter process (a in FIG. 3) is terminated, turning to the succeeding process.

Figure 4:
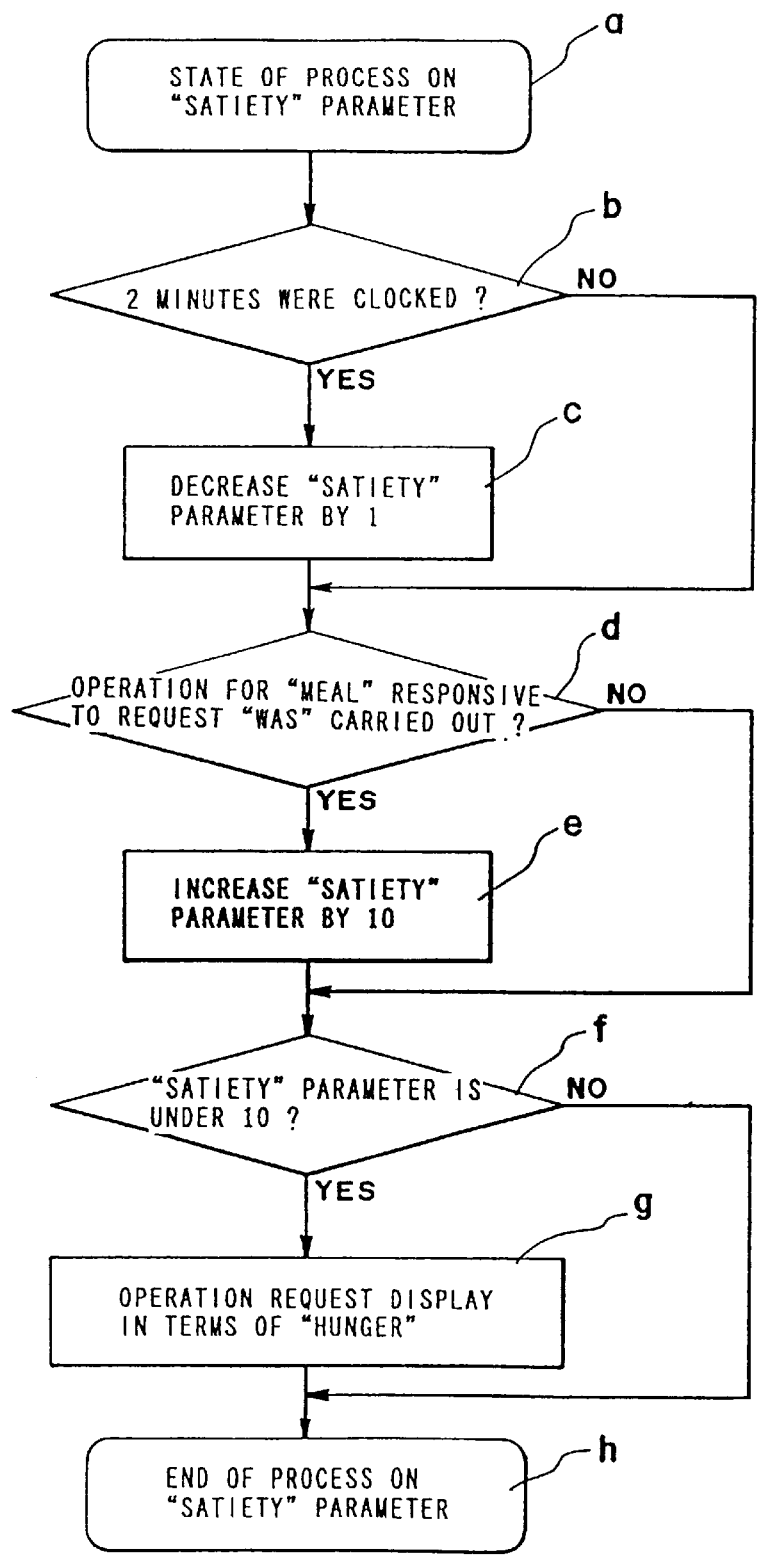
FIG. 4 is a flowchart of a "satiety" parameter process.
Figure 5:
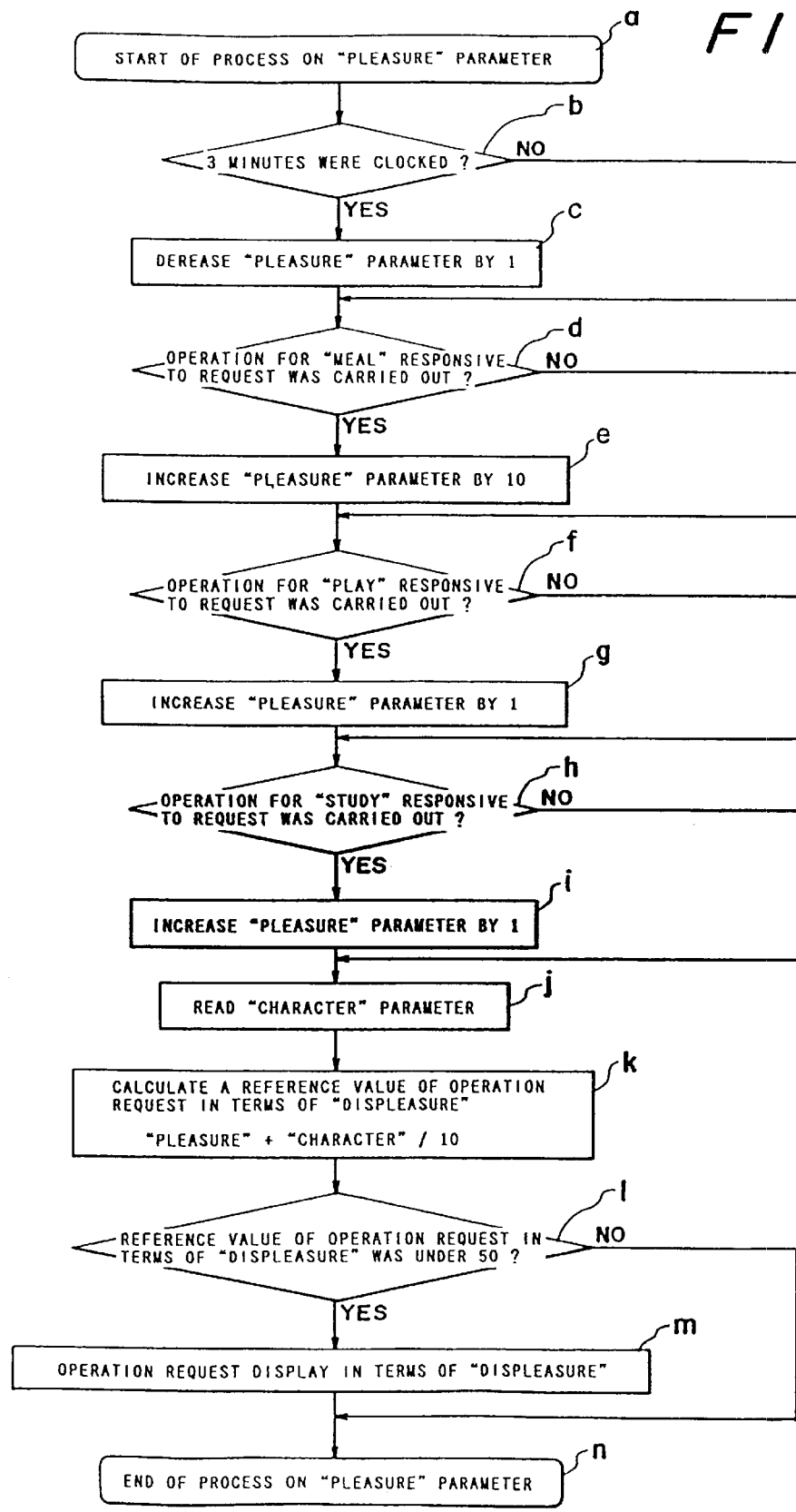
FIG. 5 is a flowchart of a "pleasure" parameter process.
Figure 6:
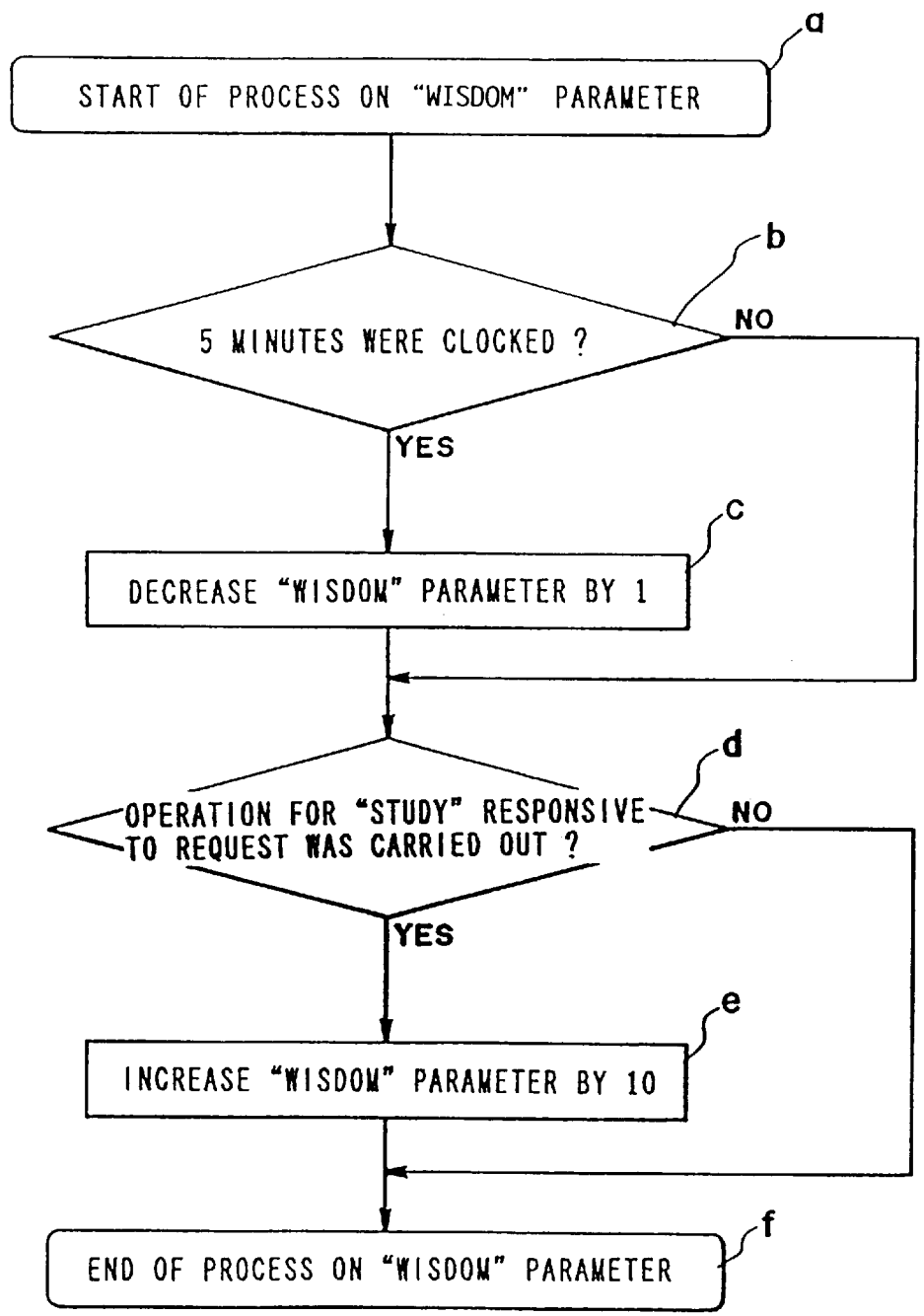
FIG. 6 is a flowchart of a "wisdom" parameter process.

In the succeeding operation request process in "hunger" (h in FIG. 3), the microcomputer 2a continuously carries out the "satiety" parameter process (FIG. 4), and the decision is made on if the "satiety" parameter has reduced to less than "10" (f in FIG. 4). Where due to the reduction to less than "10", the result of the decision (f in FIG. 4) is Yes, the operation request display in terms of "hunger" is presented on the screen of the display device 2d (g in FIG. 4), and an alarm sound is output by the voice output device 2e, whereas the result of the decision (f in FIG. 4) is No, the process (g in FIG. 4) is not executed but the operation request process "hunger" (h in FIG. 3) is terminated (h in FIG. 4). Thus, by the "satiety" parameter process (a in FIG. 3), the "satiety" parameter increases and decreases depending on the operation for "meal" responsive the request every 2minutes in the range from "0" to "99", and the range of the increase and decrease is divided into 10 notches, to allow the range of the resultant increase and decrease for display to cover 10 by the notch. By the succeeding operation request process in "hunger" (h in FIG. 3), when the requirements for the operation request in terms of "hunger" is fulfilled, the operation request display in terms of "hunger" is delivered.

In the "pleasure" parameter process (b in FIG. 3), when the microcomputer 2a starts the process (a in FIG. 5), a lapse of 3 minutes) is decided (b in FIG. 5) by means of a timer. Where due to the lapse of 3 minutes, the result of the decision (b in FIG. 5) is Yes, "1" is subtracted from the "pleasure" parameter (c in FIG. 5) whereas where the result of the decision (b in FIG. 5) is No, the subtraction process (c in FIG. 5) is not executed, but the decision is successively made on if the operation for "meal" responsive to the request is carried out (d in FIG. 5). Where the result of the decision (d in FIG. 5) is Yes, since the operation for "meal" responsive to the request is carried out, "10" is added to the "pleasure" parameter (e in FIG. 5), whereas where the result of the decision (d in FIG. 5) is No, the addition process (e in FIG. 5) is not executed, but the decision is successively made on if the operation for "play" responsive to the request is carried out with respect to the input device 2c similarly to the case of the operation item "meal" (f in FIG. 5). Where the result of the decision (f in FIG. 5) is Yes, since the operation responsive to the request is carried out, "1" is added to the "pleasure" parameter (g in FIG. 5), whereas where the result of the decision (f in FIG. 5) is No, the addition process (g in FIG. 5) is not executed, but the decision is made on if the operation for "study" responsive to the request by a player is carried out with respect to the input device 2c (h in FIG. 5), similarly to the case of the operation item "meal". Where the result of the decision (h in FIG. 5) is Yes, since the operation responsive to the request is carried out, "1" is added to the "pleasure" parameter (i in FIG. 5), whereas where the result of the decision (h in FIG. 5) is No, the addition process (i in FIG. 5) is not executed, but the "pleasure" parameter process (b in FIG. 3) is terminated, turning to the succeeding process.

In the succeeding operation request process in "displeasure" (i in FIG. 3), the microcomputer 2a reads (j in FIG. 5) the "character" parameter calculated (e in FIG. 12) by the "character" parameter process (l in FIG. 3, FIG. 12) described later in detail, and then calculates a reference value for the operation request in "displeasure" based on the mathematical formula; "pleasure" parameter value +"character" parameter value/10, and decides if the reference value is reduced to less than "50" (l in FIG. 5). Where due to the reduction to less than "50", the result of the decision (l in FIG. 5) is Yes, the operation request display in terms of "displeasure" is presented on the screen of the display device 2d (m in FIG. 5), and an alarm sound is output from the voice output device 2e. Where the result of the decision (l in FIG. 5) is No, the process (m in FIG. 5) is not executed, but the operation request process in "displeasure" (i in FIG. 3) is terminated (n in FIG. 5). By the "pleasure" parameter process (b in FIG. 3), the "pleasure" parameter increases and decreases depending on the operations for "meal", "play" and "study" responsive to the request every 3 minutes in the range from "0" to "99", and the range of the increase and decrease is divided into 10 notches to allow the range of the resultant increase and decrease for display to cover 10 by the notch. Further, by the succeeding operation request process in "displeasure" (i in FIG. 3), when the requirements for the operation request in terms of "displeasure" is fulfilled, the operation request display in terms of "displeasure" is delivered.

In the "wisdom" process (c in FIG. 3), when the microcomputer 2a starts the process (a in FIG. 6), a lapse of 5 minutes is decided (b in FIG. 6) by means of a timer. Where due to the lapse of 5 minutes, the result of the decision (b in FIG. 6) is Yes, "1" is subtracted from the "wisdom" parameter (c in FIG. 6), whereas where the result of the decision (b in FIG. 6) is No, the subtraction process (c in FIG. 6) is not executed, but the decision is successively made on if the operation for "study" responsive to the request is carried out (d in FIG. 6). Where the result of the decision (d in FIG. 6) is Yes, since the operation for "study" responsive to the request is carried out, "10" is added to the "wisdom" parameter (e in FIG. 6), whereas where the result of the decision (d in FIG. 6) is No, the addition process (e in FIG. 6) is not executed, but the "wisdom" parameter process (c in FIG. 3) is terminated (f in FIG. 5). By the "wisdom" parameter process (c in FIG. 3), the "wisdom" parameter increases and decreases depending on the operation for "study" responsive to the request every 5 minutes in the range from "0" to "99", and the range of the increase and decrease is divided into 10 notches, to allow the range of the resultant increase and decrease for display to cover 10 by the notch.

Figure 7:
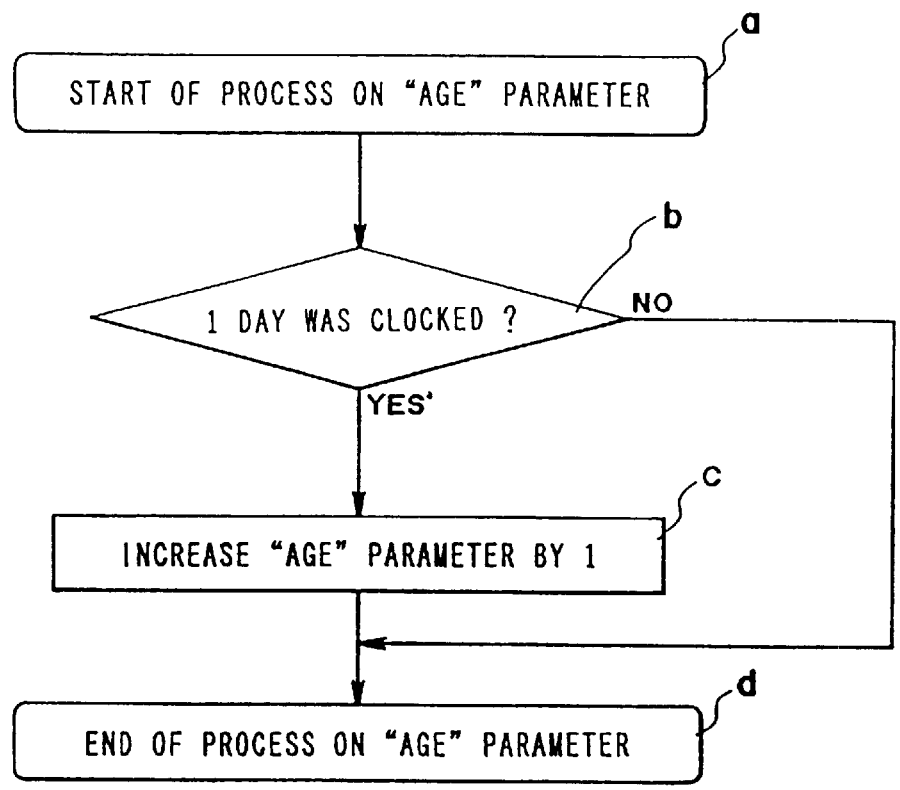
FIG. 7 is a flowchart of an "age" parameter process.

In the "age" parameter process (d in FIG. 3), when the microcomputer 2a starts the process (a in FIG. 3), a lapse of 24 hours (one day) is decided by means of a timer (b in FIG. 7). Where due to the lapse of 24 hours, the result of the decision (b in FIG. 7) is Yes, "1" is added to the "age" parameter (c in FIG. 7), whereas where the result of the decision (b in FIG. 7) is No, the addition process (c in FIG. 7) is not executed, but the "age" parameter process (d in FIG. 3) is terminated (d in FIG. 7). By the "age" parameter process (d in FIG. 3), the "age" parameter monotonously increases age by age every 24 hours (one day) from a start at "0", and an age value is presented by the gear.

Figure 8:
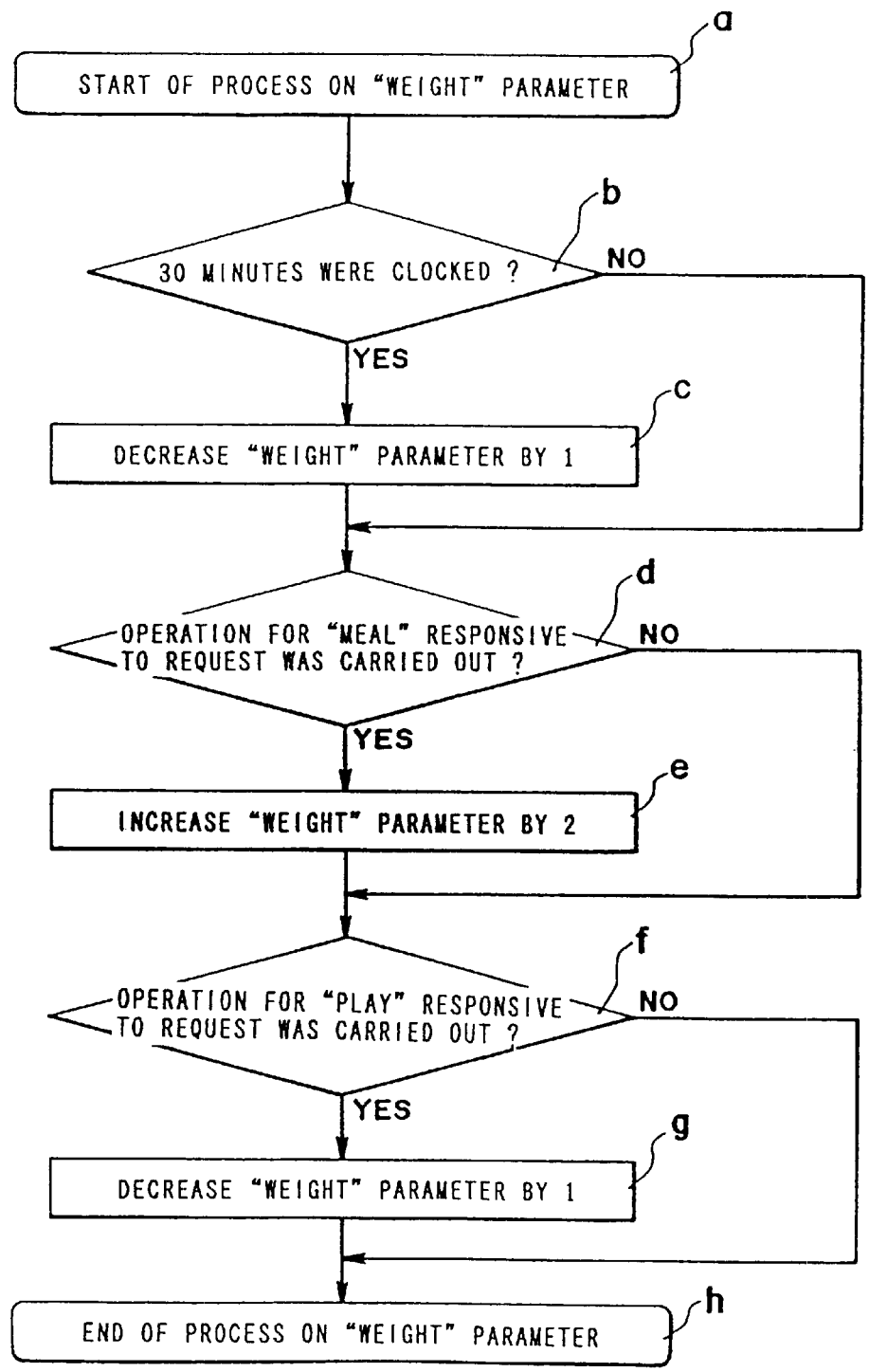
FIG. 8 is a flowchart of a "weight" parameter process.

In the "weight" parameter process (e in FIG. 3), when the microcomputer 2a starts the process (a in FIG. 8), a lapse of 30 minutes is decided by means of a timer (b in FIG. 8). Where due to the lapse of 30 minutes, the result of the decision (b in FIG. 8) is Yes, "1" is subtracted from the "weight" parameter (c in FIG. 8), whereas where the result of the decision (b in FIG. 8) is No, the subtraction process (c in FIG. 8) is not executed, but the decision is successively made on if the operation for "meal" responsive to the request is carried out (d in FIG. 8). Where the result of the decision (d in FIG. 8) is Yes, since the operation for "meal" responsive to the request is carried out, "2" is added to the "weight" parameter (e in FIG. 8). Where the result of the decision (d in FIG. 8) is No, the addition process (e in FIG. 8) is not executed, but the decision is successively made on if the operation for "play" responsive to the request is carried out (f in FIG. 8). Where the result of the decision (f in FIG. 8) is Yes, since the operation for "play" responsive to the request is carried out, "1" is subtracted from the "weight" parameter (g in FIG. 8). Where the result of the decision (f in FIG. 8) is No, the subtraction process (g in FIG. 8) is not executed, but the "weight" parameter process (e in FIG. 3) is terminated (h in FIG. 8). By the "weight" parameter process (e in FIG. 3), the "weight" parameter increases and decreases depending on the operations for "meal" and "play" responsive to the request every 30 minutes in the range from "0" to "99", and the resultant increase and decrease is presented in by the gram.

Figure 9:
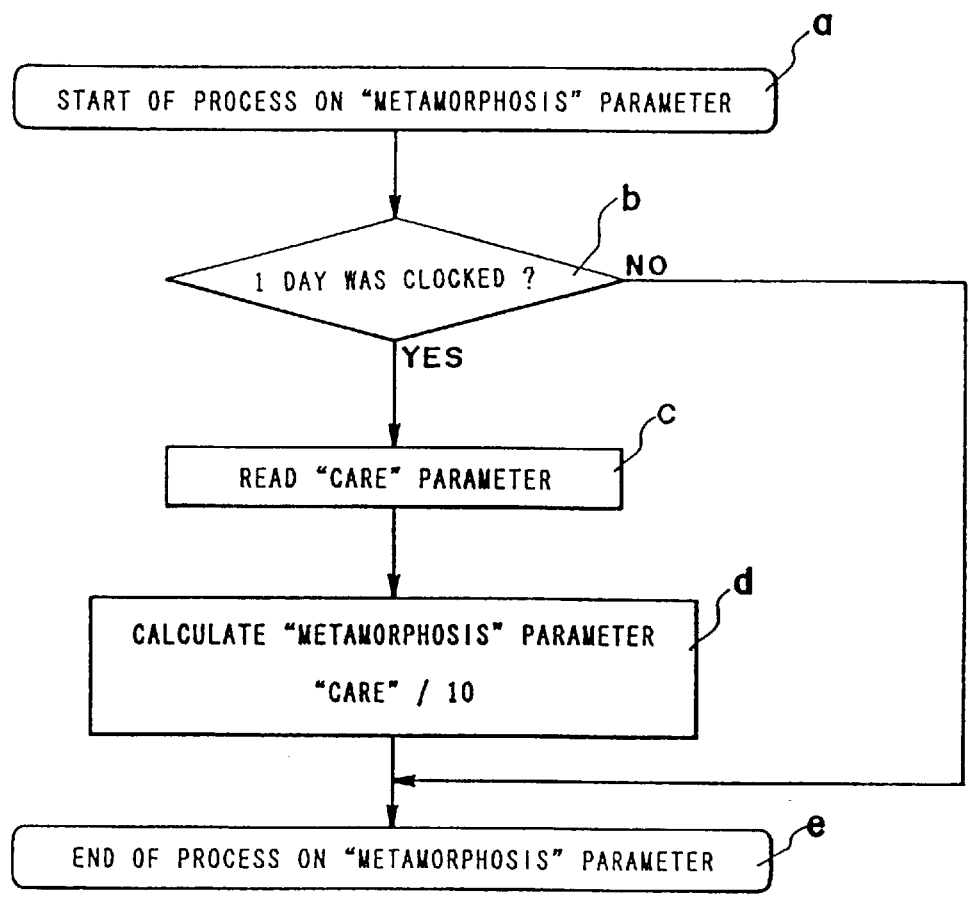
FIG. 9 is a flowchart of a "metamorphosis" parameter process.

In the "metamorphosis" parameter process (f in FIG. 3), when the microcomputer 2a starts the process (a in FIG. 9), a lapse of 24 hours (one day) is decided by means of a timer (b in FIG. 9). Where due to the lapse of 24 hours, the result of the decision (b in FIG. 9) is Yes, the "care" parameter calculated (e in FIG. 11) by the "care" parameter process (k in FIG. 3, FIG. 11) described in detail later is read (c in FIG. 9), after which the "metamorphosis" parameter is calculated (d in FIG. 9) based on the mathematical formula; "care" parameter value/10. Where the result of the decision (b in FIG. 9) is No, the read-in process (c in FIG. 9) and the operation process (d in FIG. 9) are not executed, but the "metamorphosis" parameter process (f in FIG. 3) is terminated (e in FIG. 9). By the "metamorphosis" parameter process (f in FIG. 3), the "metamorphosis" parameter increases and decreases depending on the "care" parameter every 24 hours in the range from "0" to "99", and the resultant increase and decrease is presented in terms of numerical values.

Figure 10:
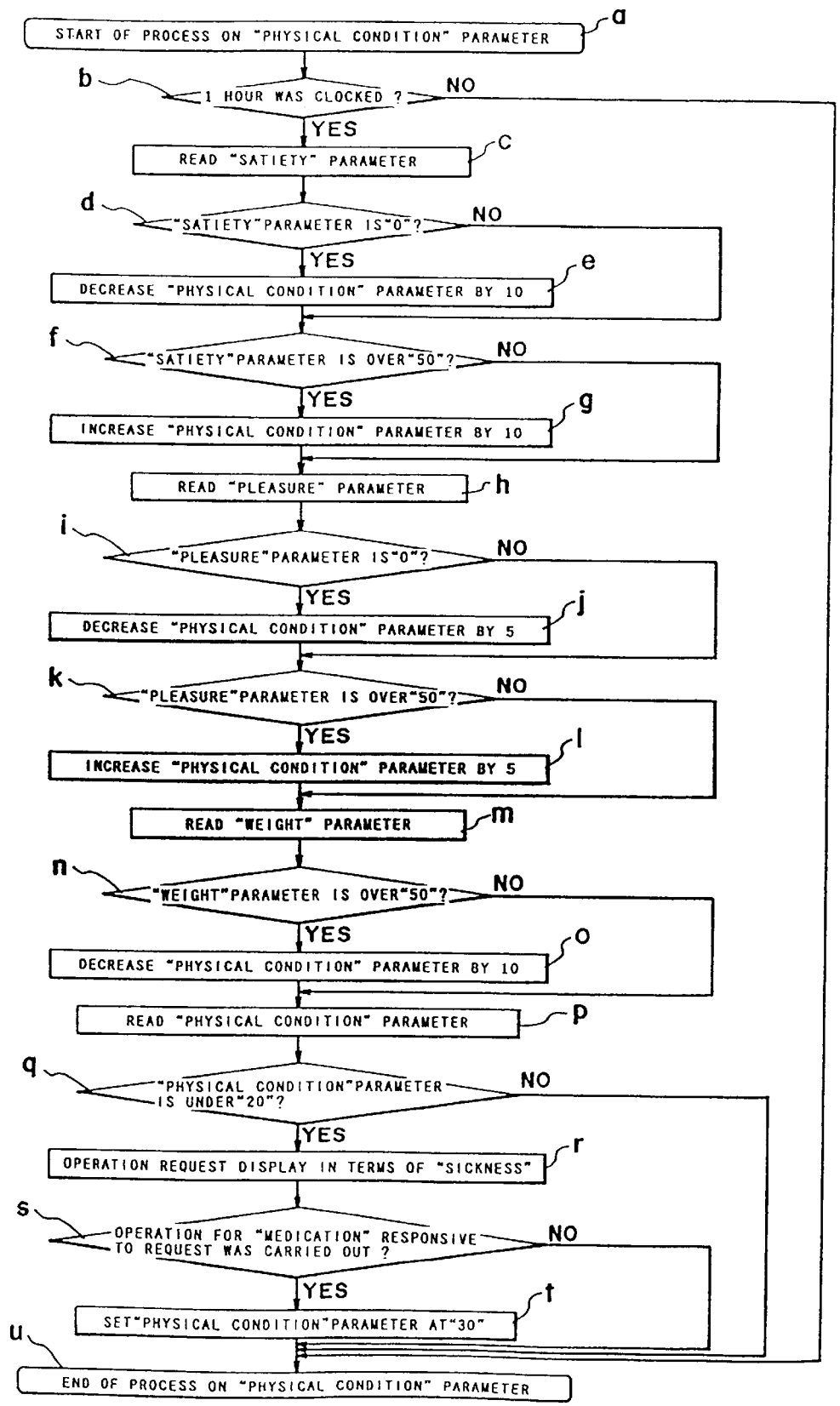
FIG. 10 is a flowchart of a "physical condition" parameter process.

In the "physical condition" parameter process (g in FIG. 3), when the microcomputer 2a starts the process (a in FIG. 10), a lapse of one hour is decided by means of a timer (b in FIG. 10). Where due to the lapse of one hour, the result of the decision (b in FIG. 10) is Yes, the microcomputer 2a reads (c in FIG. 10) the "satiety" parameter increased and decreased by the "satiety" parameter process (a in FIG. 3, FIG. 4) and thereafter decides if the "satiety" parameter value is "0" (d in FIG. 10). Where the result of the decision (d in FIG. 10) is Yes, since the value is "0", "10" is subtracted from the "physical condition" parameter (e in FIG. 10), whereas where the result of the decision (d in FIG. 10) is No, the subtraction process (e in FIG. 10) is not executed, but the decision is successively made on if the "satiety" parameter value is not less than "50" (f in FIG. 10), Where the result of the decision (f in FIG. 10) is Yes, since the value is less than "50", "10" is added to the "physical condition" parameter (g in FIG. 10), whereas where the result of the decision (f in FIG. 10) is No, the addition process (g in FIG. 10) is not executed, but the "pleasure" parameter increased and decreased by the "pleasure" parameter process (b in FIG. 3, FIG. 5) is read (h in FIG. 10), after which the decision is made on if the "pleasure" parameter value is "0" (i in FIG. 10). Where the result of the decision (i in FIG. 10) is Yes, since the value is "0", "5" is subtracted from the "physical condition" parameter (j in FIG. 10), whereas where the result of the decision (i in FIG. 10) is No, the subtraction process (j in FIG. 10) is not executed, but the decision is successively made on if the "pleasure" parameter value is not less than "50" (k in FIG. 10). Where the result of the decision (k in FIG. 10) is Yes, since the value is not less than "50", "5" is added to the "physical condition" parameter (l in FIG. 10), whereas where the result of the decision (k in FIG. 10) is No, the addition process (l in FIG. 10) is not executed, but the "weight" parameter increased and decreased by the "weight" parameter process (e in FIG. 3, FIG. 8) is read (m in FIG. 10), after which the decision is made on if the "weight" parameter value is not less than "50" (n in FIG. 10). Where the result of the decision (n in FIG. 10) is Yes, since the value is "50", "10" is subtracted from the "physical condition" parameter (o in FIG. 10), whereas where the result of the decision (n in FIG. 10) is No, the subtraction process (o in FIG. 10) is not executed, but the "physical condition" parameter process (g in FIG. 3) is terminated, turning to the succeeding process.

In the succeeding operation request process in "sickness" (j in FIG. 3), the microcomputer 2a continues the "physical condition" parameter process (p in FIG. 10), and the decision is made on if the "physical condition" parameter is reduced to not more than "20" (q in FIG. 10). Where due to the reduction to not more than "20", the result of the decision (q in FIG. 10) is Yes, the operation request display in terms of "sickness" is presented on the screen of the display device 2d (r in FIG. 10) and at the same time, an alarm sound is output by the voice output device 2a. Subsequently, the decision is made on if the operation for "medication" responsive to the request by a player is carried out with respect to the input device 2c (s in FIG. 10), similarly to the case of the request item "meal". Where the result of the decision (t in FIG. 10) is Yes, since the operation for" medication respective to the request is carried out, the "physical condition" parameter is set to "30" (t in FIG. 10). Also where the result of the decision on the "physical condition" parameter (q in FIG. 10) is No and also where the result of the decision on the "medication" parameter (s in FIG. 10) is No, the succeeding processes are not executed but the operation request process in "sickness" (j in FIG. 3) is terminated (u in FIG. 10). By the "physical condition" parameter process (g in FIG. 3), the "physical condition" parameter increases and decreases depending on the "satiety", "pleasure" and "weight" parameters and the operation for "medication" responsive to the request every one hour in the range from "0" to "99", and the resultant increase and decrease is presented in terms of numerical values. Further, by the succeeding operation request process in "sickness" (j in FIG. 3), an operation request display in terms of "sickness" is delivered when the requirements for the operation request in "sickness" is fulfilled.

Figure 11:
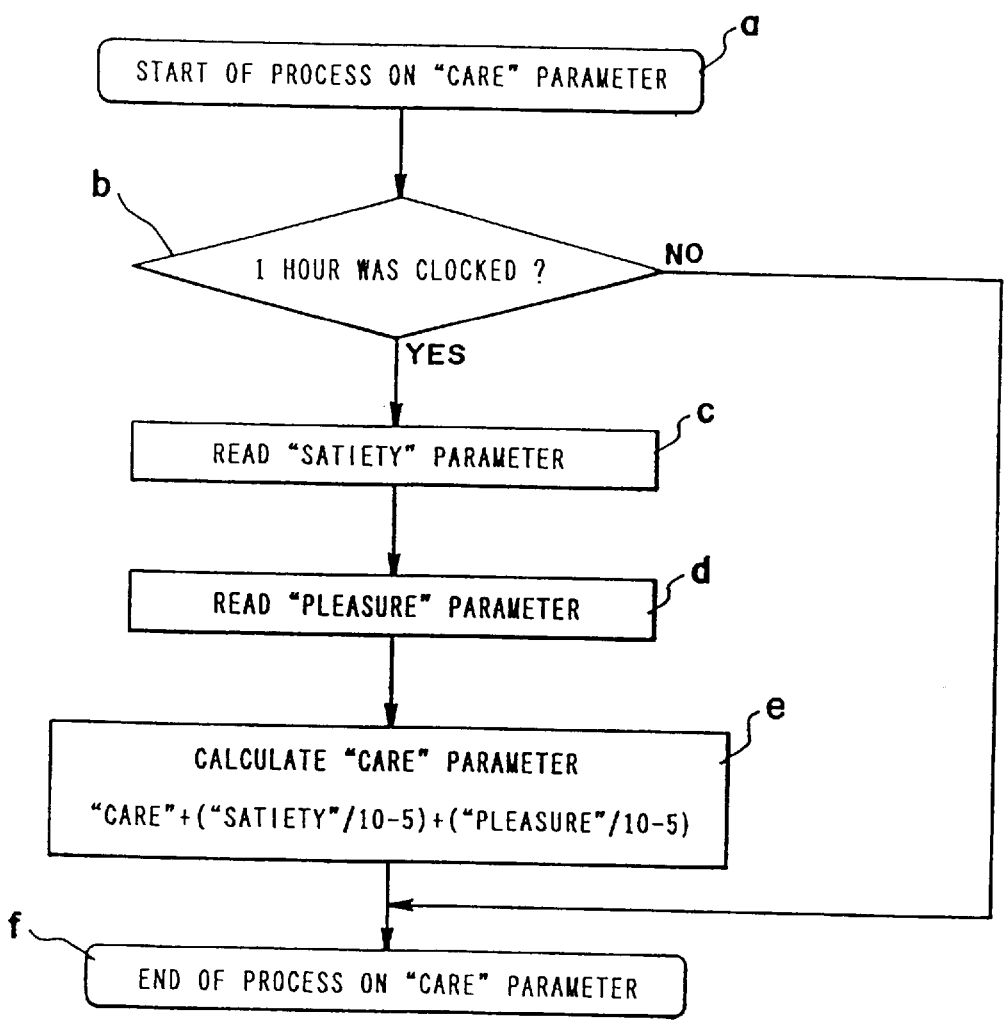
FIG. 11 is a flowchart of a "care" parameter process.

In the "care" parameter process (k in FIG. 3), when the microcomputer 2a starts the process (a in FIG. 11), a lapse of one hour is decided by means of a timer (b in FIG. 11). Where due to the lapse of one hour, the result of the decision (b in FIG. 11) is Yes, the microcomputer 2a reads (c in FIG. 11) the "satiety" parameter increased and decreased by the "satiety" parameter process (a in FIG. 3, FIG. 4) and further reads (d in FIG. 11) the "pleasure" parameter increased and decreased by the "pleasure" parameter process (b in FIG. 3, FIG. 5), after which a new "care" parameter value is calculated based on the mathematical formula:

Present "care" parameter value+("satiety" parameter value/10−5)+ ("pleasure" parameter value/10−5.

The present "care" parameter value is then replaced with the new "care" parameter value (e in FIG. 11), and the "care" parameter process (k in FIG. 3) is terminated (f in FIG. 11). By the "care" parameter process (k in FIG. 3), the "care" parameter increases and decreases depending on the "satiety" and "pleasure" parameters every one hour in the range from "0" to "99", and the resultant increase and decrease is presented in terms of numerical values.

Figure 12:
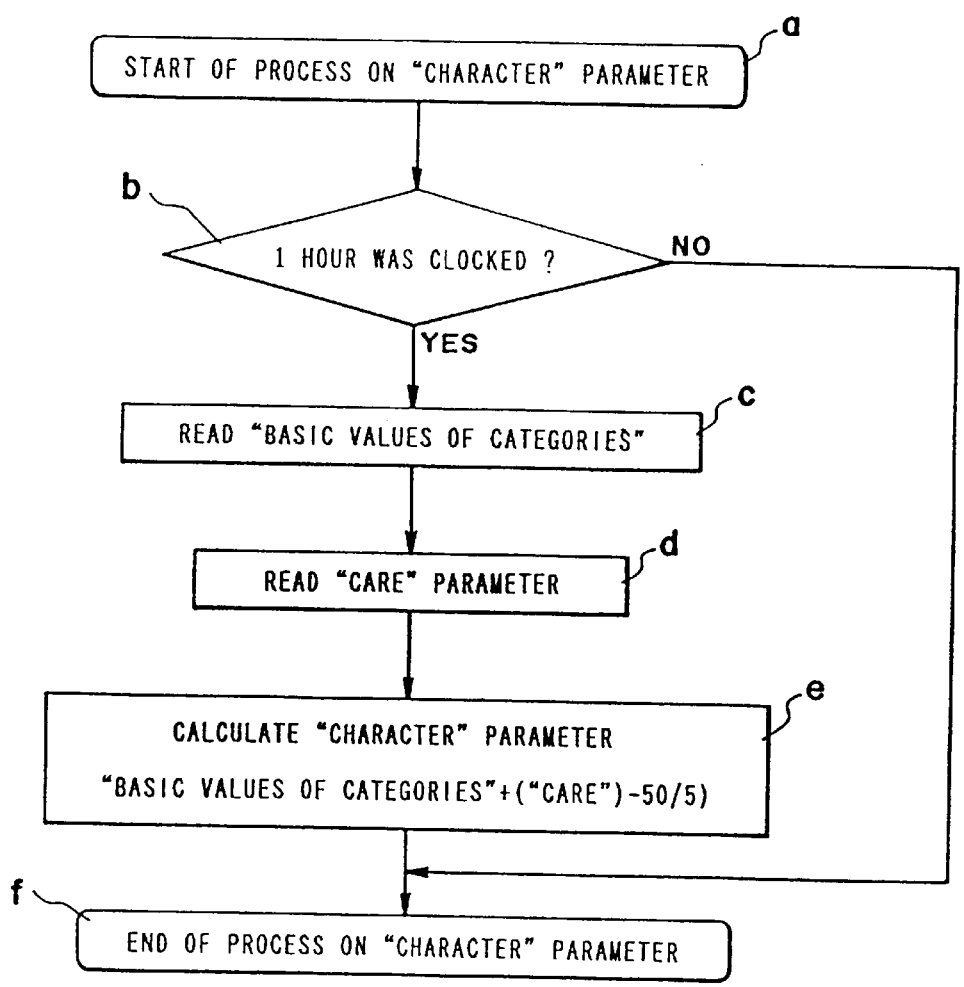
FIG. 12 is a flowchart of a "character" parameter process.
Figure 13:
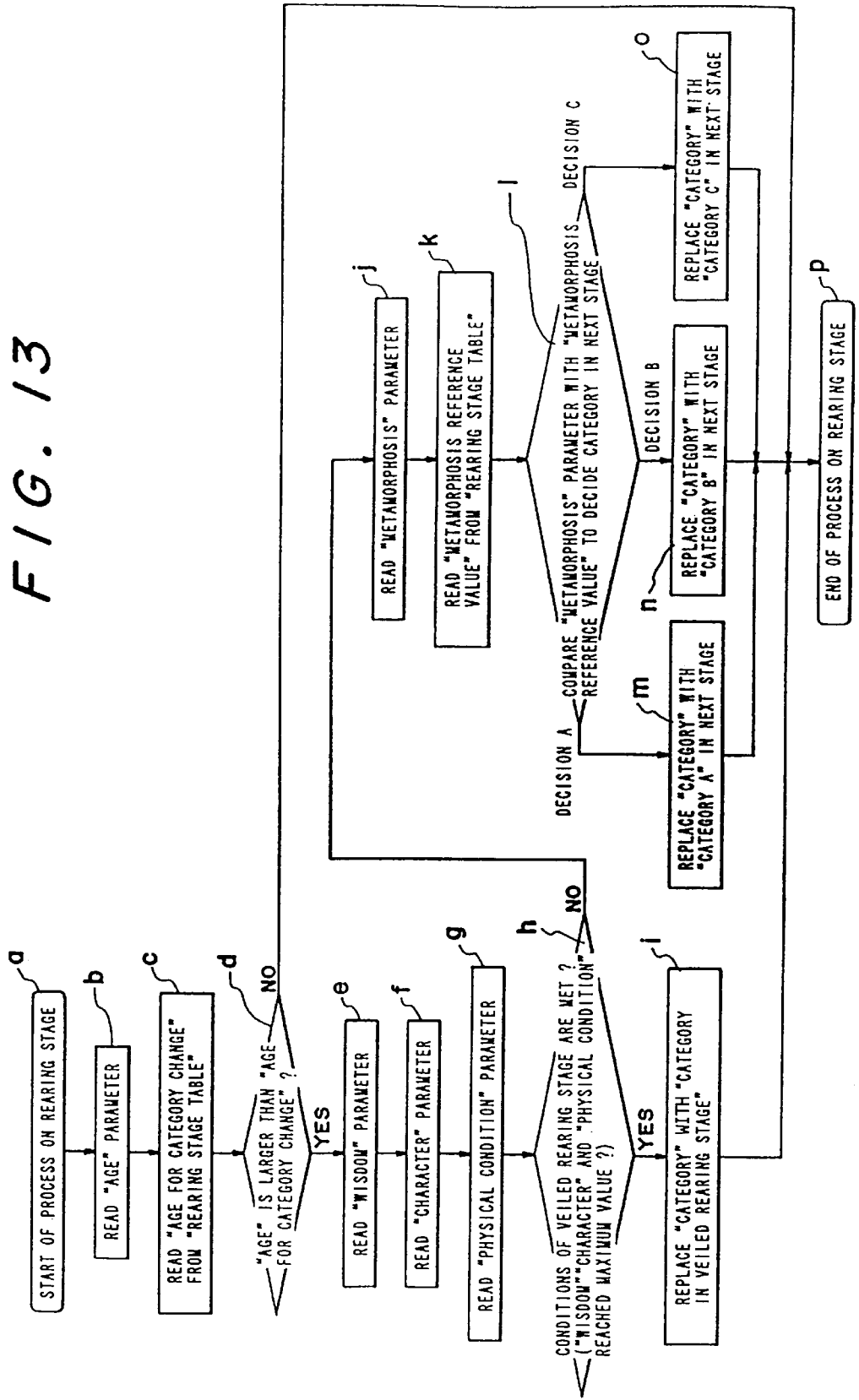
FIG. 13 is a flowchart of a rearing stage process.

In the "character" parameter process (l in FIG. 3), when the microcomputer 2a starts the process (a in FIG. 12), a lapse of one hour is decided by means of a timer (b in FIG. 12). Where due to the lapse of one hour, the result of the decision (b in FIG. 12) is Yes, a "basic value of category" corresponding to a subject category is read (c in FIG. 12) from an address assigned to a category of the present rearing stage on the rearing stage table (FIG. 14) referred to in the rearing stage process (FIG. 13) described in detail later, and further the "care" parameter calculated by the "care" parameter process (k in FIG. 3, FIG. 11) is read (d in FIG. 12), after which the "character" parameter is calculated (e in FIG. 12) based on the mathematical formula:

"basic value of category"+("care" parameter value−50)/5

The "character" parameter process (l in FIG. 3) is terminated (f in FIG. 12). By the "character" parameter process (l in FIG. 3), the "character" parameter increases and decreases depending on the "basic value of category" and "care" parameters every one hour in the range from "−50" to "+50", and the resultant increase and decrease is present in terms of numerical values.

In the rearing stage process (m in FIG. 3), when the microcomputer 2a starts the process (a in FIG. 13), the microcomputer 2a reads (b in FIG. 13) the "age" parameter counted by the "age" parameter process (d in FIG. 3, FIG. 7), further reads (c in FIG. 13) the "age for promoting a category" corresponding to the subject category from an address assigned to the category of the present rearing stage on the rearing stage table (FIG. 14), and decides (d in FIG. 13) if the "age" parameter value reaches the "age for promoting a category" value, that is, if the age of the virtual living thing reaches a retaining period (a partial span of life for a rearing stage) set peculiarly to the category at the present rearing stage. Where due to the expiration of the retaining period, the result of the decision (d in FIG. 13) is Yes, the "wisdom" parameter increased and decreased by the "wisdom" parameter process (c in FIG. 3, FIG. 6) is read (e in FIG. 13). Successively, the "character" parameter calculated by the "character" parameter process (l in FIG. 3, FIG. 12) depending on the "care" parameter and the "basic value of a category are read (f in FIG. 13), and further the "physical condition" parameter increased and decreased by the "physical" parameter process (g in FIG. 3, FIG. 8) depending on the "satiety", "pleasure" and "weight" parameters and the operation for "medication" responsive to the request is read (g in FIG. 13), after which the decision is made on if the predetermined requirements for the "veiled rearing stage" set under a state not open to the public in advance, for example, the decision is made on if the requirements of "wisdom" parameter value="99", "character" parameter value="50" and "physical condition" parameter value="99" are fulfilled (h in FIG. 3). Where the result of the decision (h in FIG. 13) is Yes, since the requirements for the veiled rearing stage are fulfilled, a pointer in the rearing stage table (FIG. 14) shifts its position to point at an address assigned to the category of the "veiled rearing stage" from an address assigned to the category of the present rearing stage, for example, to N99 in FIG. 14 whereby the present category is replaced with the category of the "veiled rearing stage" (i in FIG. 15) as the next rearing stage, and the rearing stage process (m in FIG. 3) is terminated (p in FIG. 13). This is, however, an unusual case. Where the result of the decision (h in FIG. 13) is No in the overwhelming majority of cases, successively the "metamorphosis" parameter calculated by the "metamorphosis" parameter process (f in FIG. 3, FIG. 9) depending on the "care" parameter is read (j in FIG. 13), and further the "metamorphosis reference value" corresponding to the subject category is read (k in FIG. 13) from an address assigned to the category of the present rearing stage on the rearing stage table (FIG. 14). Then, a pointer on the rearing stage table (FIG. 14) shifts its position to point at an address assigned to another category so that one category is selected out of a plurality of categories at the rearing stage based on a relative relation for comparison between the "metamorphosis" parameter value and the "metamorphosis reference value". In this case, when a pointer points at an address N1 so as to read category 1 (b in FIG. 15) at the present rearing stage, "50" of the "metamorphosis reference value" stored while being related to the category 1 at an address N1, which is compared with the "metamorphosis" parameter value at that time. Where the decision is made on that the "metamorphosis" parameter value is smaller than "50" of the "metamorphosis reference value", an indirect address N2 in the address N1 storing the present category is read, and a pointer shifts its position to point at the address N2 to select the category A2 (c in FIG. 15) at the next rearing stage, whereas where the decision is made on that the "metamorphosis" parameter value is smaller than "50"+"20" of the "metamorphosis reference value", an indirect address N3 is read, and a pointer shifts its position to point at an address N3 to select the category B2 (d in FIG. 15) at the next rearing stage. Further, where the decision is made on that the "metamorphosis" parameter value is larger than "50"+"20" of the "metamorphosis reference value", an indirect address N4 is read, and a pointer shifts its position to point at an address N4 to select the category C2 (e in FIG. 15) at the next rearing stage, and the rearing stage process (m in FIG. 3) is terminated (p in FIG. 3).

FIG. 14 is an explanatory view illustrating the constitution of the rearing stage process table referred to in the above-described rearing stage process.(FIG. 13) FIG. 14 illustrates that the respective "the basic value of category", "the reference value of metamorphosis" and "the age for promoting a category" are stored related to the categories at every rearing stage of the virtual living thing, and further illustrates that three categories A2, B2 and C2 which are selectable as categories of the next rearing stage succeeding every instant category are also stored in such a way as to be related to the instant category through the indirect addresses N2, N3 and N4. The data on the virtual living thing stored corresponding to the categories on the rearing stage table expresses the basic generic character, and one category at one rearing stage of the virtual living thing is defined by the data. The whole categories in all the rearing stages stored in one rearing stag table are all the categories at every selectable rearing stage with respect to one virtual living thing, which is, in a word, heredity information for one virtual living thing. An address N99 illustrates the storage of the data of the veiled category at the veiled rearing stage. This address is designated in accordance with the requirements for the veiled rearing stage depending on the "wisdom", "character" and "physical condition" parameters except the metamorphosis requirements depending on "the reference value of metamorphosis", and is not designated by the indirect addresses. The technology itself, in which such a rearing stage table as described is realized within the memory 2b connected in bus 2f to the microcomputer 2a in the hardware constitution of the rearing simulation apparatus, is known and need not be explained.

While in the above-illustrated constitution, the number of selectable categories in the succeeding rearing stage is illustrated to be three, the technical meaning of limiting to three is not particularly present, and also the metamorphosis requirements and the requirements for the veiled rearing stage are easily replaced equivalently with various requirements and are not limited to those illustrated.

Figure 15:
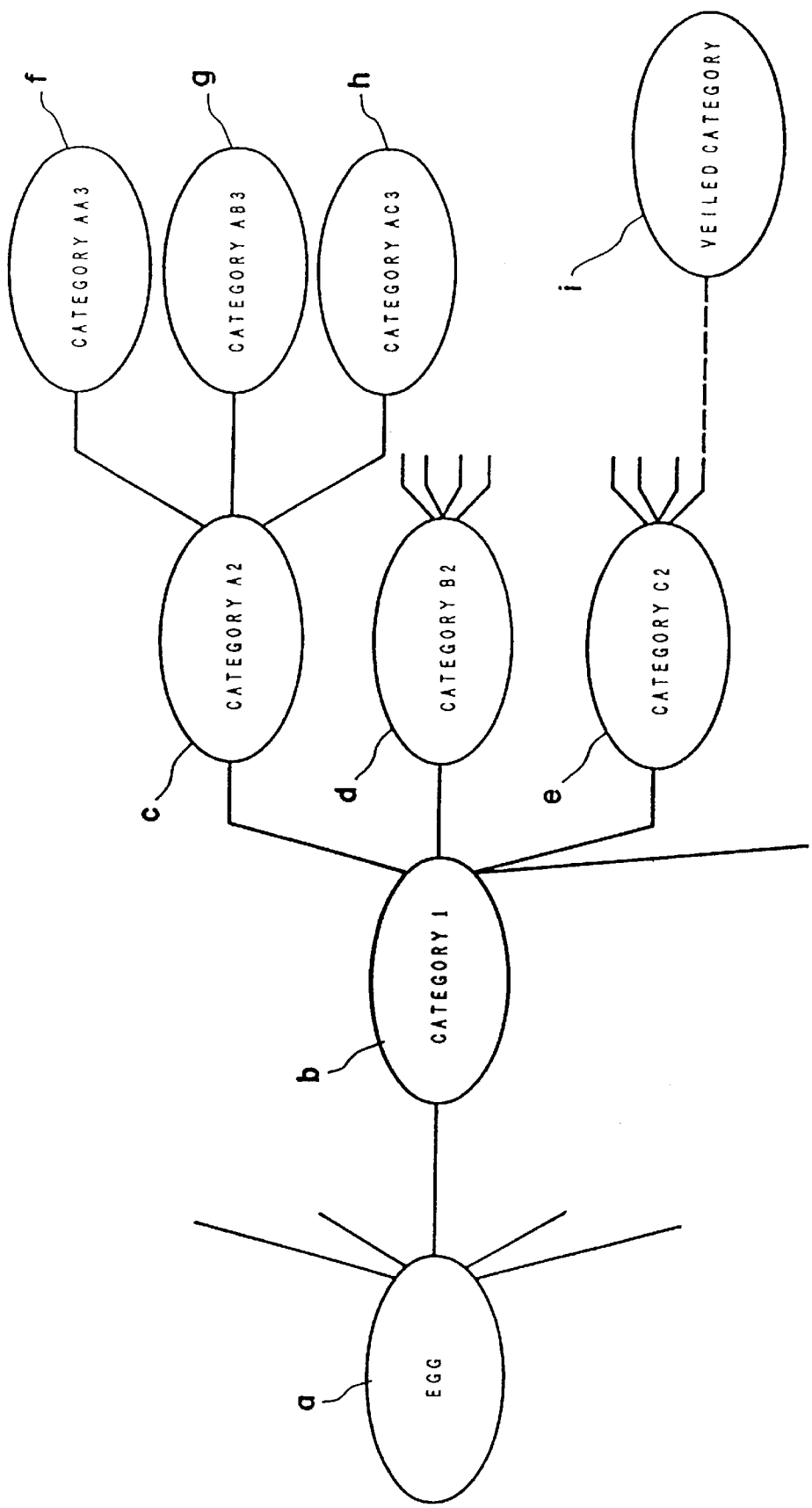
FIG. 15 is a block diagram showing a route of the metamorphosis in the categories of a virtual living thing at every rearing stage.

FIG. 15 is a block diagram showing the routes of the metamorphosis in the categories lodged in every rearing stage of a virtual living. A plurality of categories lodged in the rearing stage succeeding an egg (a in FIG. 15) in the initial rearing stage are selectably branched, and a plurality of selectable categories in the succeeding rearing stage include a category 1 (b in FIG. 5) which is illustrated to be stored at the address N1 in the rearing stage table of FIG. 14. Further, a plurality of categories lodged in the rearing stage succeeding the rearing stage including the category 1 are selectably branched, and a plurality of categories at the rearing stage include a category A2 (c in FIG. 15) which is illustrated to be stored at the address N2 in the rearing stage table of FIG. 14, further a category B2 (d in FIG. 15) which is illustrated to be stored at the address N3, and a category C2 (e in FIG. 15) which is illustrated to be stored at the address N4. Similarly, the succeeding rearing stage includes a category AA3 (f in FIG. 15), a category AB3 (g in FIG. 15), and a category AC3 (h in FIG. 15), and a veiled category (i in FIG. 15).

Figure 17:
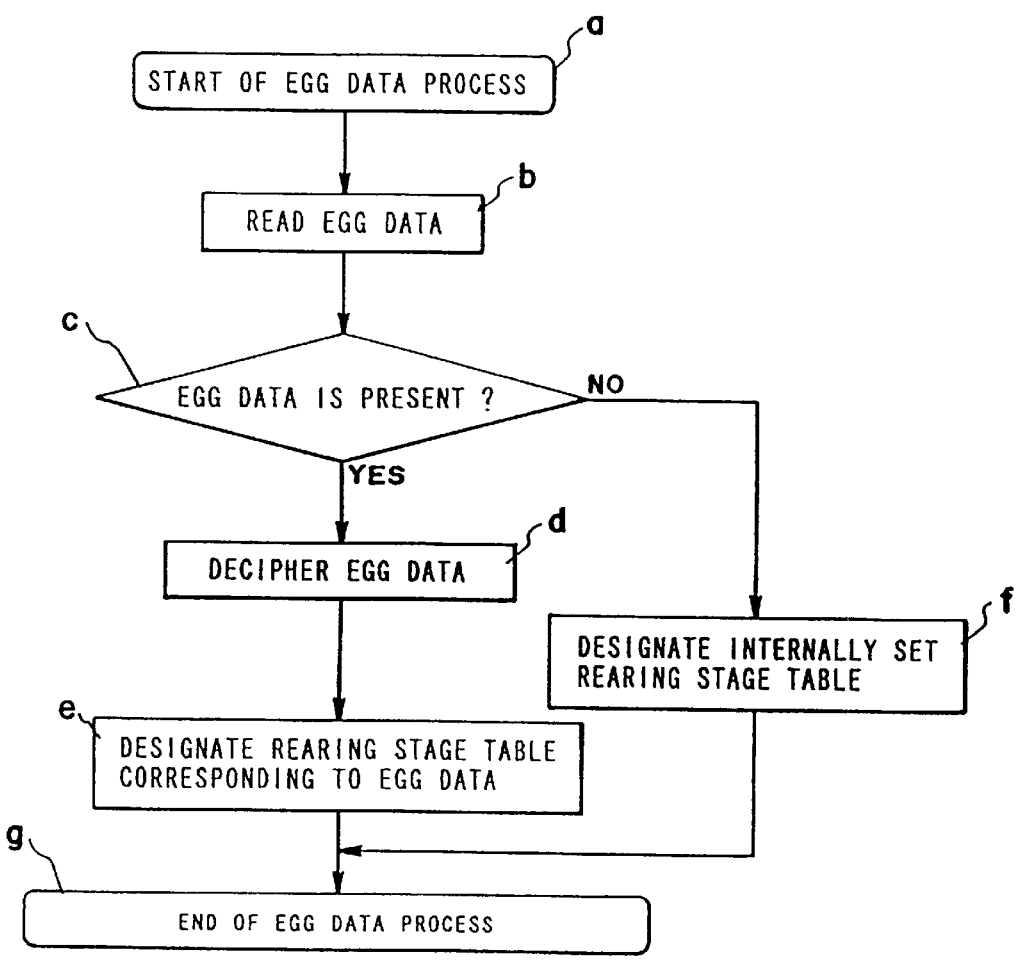
FIG. 17 is a flowchart of an egg data process.

The egg data process is carried out prior to the aforementioned rearing stage process. When the microcomputer 2a starts the process (a in FIG. 7), an output on the apparatus end of the network interface 2g is read by the conventional communication control process which realizes the egg data receiving means F (b in FIG. 17) to decide that a new egg data, that is a data on an egg of the virtual living thing is received via the communication network (c in FIG. 17). Where the result of the decision (c in FIG. 17) due to the receipt of the egg data is Yes, the egg data is deciphered (d in FIG. 17), and one rearing table designated by the egg data is selected out of the a plurality of rearing tables prepared (e in FIG. 17). Where the result of the decision (c in FIG. 17) is No due to the receipt of no egg data, the rearing stage table internally set in advance is selected to terminate the egg data process (FIG. 17). One rearing table is selected out of the a plurality of rearing stage tables prepared for every virtual living thing by the process as described above, whereby another virtual living thing, that is, the total categories at every selectable rearing stage are switched to another total categories to give, upon a player, an impression as if pieces of different heredity information gave birth to another virtual living thing. Incidentally, one rearing stage table illustrated in FIG. 14 serves to be used for one virtual living thing, and to switch the rearing stage table to an entirely different rearing stage table also means that the metamorphosis route view illustrated in FIG. 15 is replaced with another metamorphosis route view which is initiated by another egg.

The heredity information termed herein corresponds to the information of the whole rearing stage table. Further, the data of one line corresponding to a category (address) out of the categories lodged in one rearing stage in the rearing stage table are called the data on an virtual living thing. The data on the virtual living thing can be received and transmitted between the rearing simulation control station 2C and rearing simulation apparatus on the communication network 1 via the network interface 2g by the conventional communication control process which realizes a living thing data transmitting and receiving means G.

Assuming that the rearing stage tables in the rearing simulation apparatus 2A, 2B and the rearing simulation control station 2C are designed for being co-operated with each other, the constitution of the data on a virtual living thing received and transmitted will suffice, for example, to include a user identification data for identifying a user and apparatus, a table identification data for identifying a rearing stage table peer se further a virtual living thing and an address of a rearing stage table for identifying a category thereof. The data on the virtual living thing as described above are transmitted to the rearing simulation control station 2C, where as a sort of game process, the data are preferably converted to the data on a virtual living thing which are designed to express another category within a coverage of the same rearing table identified by the table identification data, further the same virtual living thing to be sent back to the rearing simulation apparatus 2A and 2B. In this case, in the rearing simulation apparatus 2A and 2B, the converted data attached to the user identification data and the table identification data are deciphered by the conventional method to get access to an address designated by the converted data in terms of the game process on the subject rearing stage table, thereby enabling the production of the second advent of an unexpected category of an unexpectedly converted stage, so to speak, the situation of "First call at old home with transformation".

Figure 16:
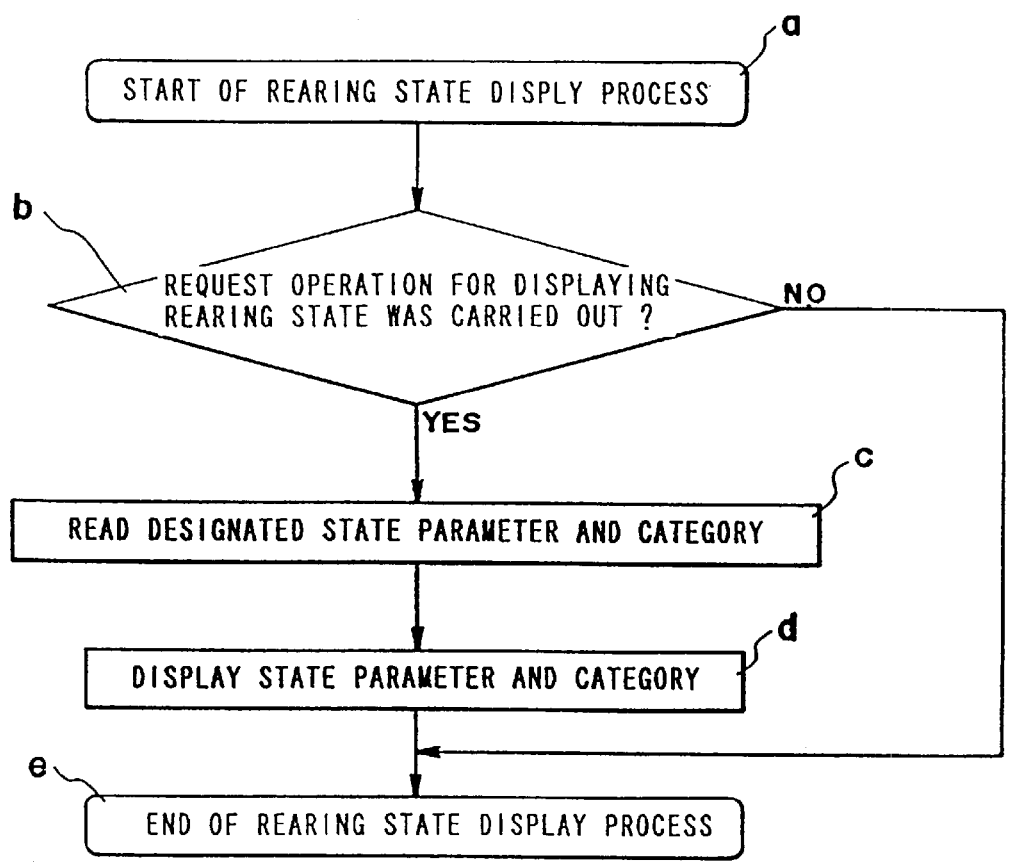
FIG. 16 is a flowchart of a rearing stage display process.

Turning back to FIG. 3, in the rearing state display process (n in FIG. 3), when the microcomputer 2a starts the process (a in FIG. 16), the decision is made on if the request operation for displaying the rearing state has done by a player for the input device 2c (b in FIG. 16), and where the result of the decision (b in FIG. 16) is Yes since the request operation has done, the present value of a state parameter as well as the present category at the rearing stage which are designated by the request operation for displaying the rearing state are read in the state parameter process and the rearing stage process (c in FIG. 16), and the designated state parameter and the category are displayed in terms of numerals or figures on the screen of the display device 24 (d in FIG. 16). The rearing state display process is then terminated (e in FIG. 16).

INDUSTRIAL APPLICABILITY

As described above, according to the first aspect of this invention, there is provided a rearing simulation apparatus in which the categories of a virtual living thing through all the rearing stages are increased in large scale to variegate the game development of the raring simulation thereby enhancing the satisfaction of a player in tastefulness in terms of game. According to the second aspect of this invention, there is provided a rearing simulation apparatus in which the generic character of an actual living thing is emphatically expressed to express the virtual living thing as one who is blessed with the generic character of "friendly" in one aspect and of "wily" in the other aspect to make the tastefulness in game more affluent. According to the third aspect of this invention, there is provided a rearing simulation apparatus in which the range of the game is expanded to the communication network also to enable the enhancement of the unexpectedness of the game development. Such rearing simulation apparatuses as described above meet greatly the needs for the play of the consuming general public, which apparatuses are high in value of industrial use.

What is claimed is:

1. A rearing simulation apparatus, comprising:

state parameter processing means A for increasing and decreasing a state parameter based on variables fluctuating chronometrically in connection with the state parameter representative of a virtual living thing and variables fluctuating in operation properties in connection with said state parameter responsive to an operation responsive to a request by a player, state parameter processing means A further carrying our "care" and "character" parameter processing which increases and decreases a "care" parameter representative of a degree of "care" with respect to the virtual living thing according to completeness of an operation responsive to a request by the player and increases and decreases a "character" parameter influencing requirements for an operation request of the virtual living thing based on said "care" parameter and a "basic value of a category" set peculiar to the category of the virtual living thing at every rearing stage, operation request processing means B for carrying out the operation request in predetermined items when said state parameters meet predetermined requirements for the operation request which arc influenced by the "character" parameter, operation request display means C for displaying the operation request in the predetermined items for the player, rearing stage processing means D for metamorphosing the virtual living thing to a next rearing stage based on metamorphosis requirements depending on the state parameters, when a category promoting ace representative of a period of life set peculiarly to the category of the virtual living thing at every rearing stage has elapsed, said metamorphosis requirements being connected with the category at the present rearing stage, rearing state display means E for displaying said state parameter or said category which is designated by a request operation for displaying the rearing stare in response to the request operation for the rearing state, and egg data receiving means F for receiving data on an egg of a virtual living thing via a communication network, wherein said rearing stage processing means D replaces a whole or a part of a plurality of categories lodged in one or plural rearing stages with other categories based on the data on the egg of the virtual living thing received, and selects based on metamorphosis requirements one category oat of a plurality of categories including said other categories replaced which are lodged in the next rearing stage to promote the virtual living thing to the next rearing stage.

2. A rearing simulation apparatus according to claim 1, wherein said state parameter processing means A calculates a "metamorphosis" parameter influencing the metamorphosis requirements based on the "care" parameter; and said rearing stage processing means D comprises selecting means for selecting one category out of a plurality of categories applicable to a subsequent rearing stage with a basis in said "metamorphosis" parameter.

3. A rearing simulation apparatus according to claim 1, wherein said rearing stage processing means D selects one category out of a plurality of categories associated with a next rearing stage based on the metamorphosis requirements depending on the state parameters, which metamorphosis requirements characterize the selected category in the next rearing stage.

4. A rearing simulation apparatus according to claim 1, further comprising living thing data transmitting and receiving means G for transmitting and receiving, via the communication network, data on the virtual living thing including data representative of the state parameters as well as data representative of die category of the virtual living thing, said data on the virtual living thing including player identification data for identifying a player's apparatus, a table identification data for identifying a rearing stage table and an address of the rearing stage table for identifying the category of the virtual living thing, further being converted at another rearing simulation apparatus on the communication network to the data on tie virtual living thing, representative of another category of the virtual living thing to be sent back to said living thing data transmitting and receiving means G.

5. A rearing simulation apparatus according to claim 1, wherein said state parameter processing means A increases and decreases the "care" parameter representative of a degree of "care" with respect to the virtual living thing according to the completeness of an operation by the player in response to an operation request from the virtual living thing, and calculates based on the "care" parameter a metamorphosis parameter influencing metamorphosis requirements to metamorphose the virtual living thing; and rearing stage processing means D causes the virtual living thing to metamorphose to a next rearing stage based on the metamorphosis requirements depending on the metamorphosis parameter and a metamorphosis reference value set peculiarly to a category of a present rearing stage.

6. A rearing simulation apparatus according to claim 1, wherein rearing stage processing means D selects a veiled category out of a plurality of categories lodged in the next raring stage to promote the virtual living thing to the next rearing stage, when state parameters meet requirements for a veiled rearing stage, the requirements for the veiled rearing stage being met less often in comparison with the metamorphosis requirements.

7. A rearing simulation apparatus according to claim 1, further comprising living thing data transmitting and receiving means G for transmitting and receiving, via the communication network, data on the virtual living thing including data representative of the state parameters as well as data representative of the category.

* * * * *